US012131144B2

(12) United States Patent
Wang et al.

(10) Patent No.: US 12,131,144 B2
(45) Date of Patent: Oct. 29, 2024

(54) UPDATING OPERATING SYSTEM DATA IN A STATIC PARTITION OF AN ELECTRONIC DEVICE

(71) Applicant: HONOR DEVICE CO., LTD., Shenzhen (CN)

(72) Inventors: Yanzhao Wang, Shenzhen (CN); Chao Chen, Shenzhen (CN); Zenghui Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/928,743

(22) PCT Filed: Jun. 15, 2022

(86) PCT No.: PCT/CN2022/098863
§ 371 (c)(1),
(2) Date: Nov. 30, 2022

(87) PCT Pub. No.: WO2022/262754
PCT Pub. Date: Dec. 22, 2022

(65) Prior Publication Data
US 2024/0220226 A1 Jul. 4, 2024

(30) Foreign Application Priority Data
Jun. 15, 2021 (CN) .......................... 202110662973.1

(51) Int. Cl.
*G06F 8/65* (2018.01)
*G06F 9/4401* (2018.01)
(52) U.S. Cl.
CPC .............. *G06F 8/65* (2013.01); *G06F 9/4406* (2013.01)
(58) Field of Classification Search
None
See application file for complete search history.

(56) References Cited

U.S. PATENT DOCUMENTS 8,635,425 B1 * 1/2014 Adogla ..................... G06F 8/63
714/710
8,725,995 B1    5/2014 Kim et al.
(Continued)

FOREIGN PATENT DOCUMENTS

CN      101477471 A    7/2009
CN      103092662 A    5/2013
(Continued)

OTHER PUBLICATIONS

Howard John S.; "An Introduction to Live Upgrade"; Jul. 31, 2000; 12 pages; XP093111626; Retrieved from the internet, URL:https://www.filibeto.org/sun/lib/blueprints/2002-vol4-cd/0700/lu.pdf.
(Continued)

*Primary Examiner* — Qing Chen
(74) *Attorney, Agent, or Firm* — WOMBLE BOND DICKINSON (US) LLP

(57) ABSTRACT

Embodiments of this application provides an operating system data update method, a device, a storage medium, and a computer program product. The method is applied to an electronic device. After starting, the electronic device loads data from a basic partition, a first static partition, and a dynamic partition to run a first operating system. After the first operating system runs, the method includes: obtaining a patch package based on the version number of the first operating system; updating data in the second static partition based on the patch package, after confirming the data of the first static partition is consistent with the data of the second static partition; modifying a startup sequence of the electronic device from starting from the first static partition to starting from the second static partition; restarting the electronic device.

20 Claims, 18 Drawing Sheets

(56) References Cited

U.S. PATENT DOCUMENTS

| | | |
|---|---|---|
| 9,454,356 B2 | 9/2016 | Qin |
| 2009/0121028 A1 | 5/2009 | Asnaashari et al. |
| 2011/0004871 A1 | 1/2011 | Liu |
| 2012/0291021 A1* | 11/2012 | Banerjee ............ G06F 9/45558 717/173 |
| 2013/0067191 A1* | 3/2013 | Mehra .................. G06F 3/0689 711/E12.002 |
| 2014/0229724 A1* | 8/2014 | Chen ........................ G06F 9/441 713/2 |
| 2016/0092202 A1 | 3/2016 | Filali-Adib et al. |
| 2016/0147997 A1* | 5/2016 | Dover .................. G06F 9/4406 713/2 |
| 2020/0089616 A1* | 3/2020 | Geng .................. G06F 9/44573 |
| 2020/0142472 A1* | 5/2020 | Golov .................. G06F 3/0649 |

FOREIGN PATENT DOCUMENTS

| | | |
|---|---|---|
| CN | 104182255 A | 12/2014 |
| CN | 106055430 A | 10/2016 |
| CN | 106802813 A | 6/2017 |
| CN | 107168731 A | 9/2017 |
| CN | 107967141 A | 4/2018 |
| CN | 109032846 A | 12/2018 |
| CN | 109408153 A | 3/2019 |
| CN | 109885325 A | 6/2019 |
| CN | 110175039 A | 8/2019 |
| CN | 110543321 A | 12/2019 |
| CN | 110737453 A | 1/2020 |
| CN | 110780890 A | 2/2020 |
| CN | 111522569 A | 8/2020 |
| CN | 111694585 A | 9/2020 |
| CN | 112764627 A | 5/2021 |
| CN | 112783537 A | 5/2021 |
| CN | 113821235 A | 12/2021 |
| IN | 111104148 A | 5/2020 |

OTHER PUBLICATIONS

Cczhengv; "Android10 Dynamic Partition Introduction"; Mar. 24, 2020; Retrieved from the internet,URL:https://blog.csdn.net/u012932409/article/details/105075851.

Tianfu Yunchuang; "Virtual A/B Overview"; Jan. 6, 2021; Retrieved from the internet,URL:https://blog.csdn.net/enweitech/article/details/112286878.

* cited by examiner

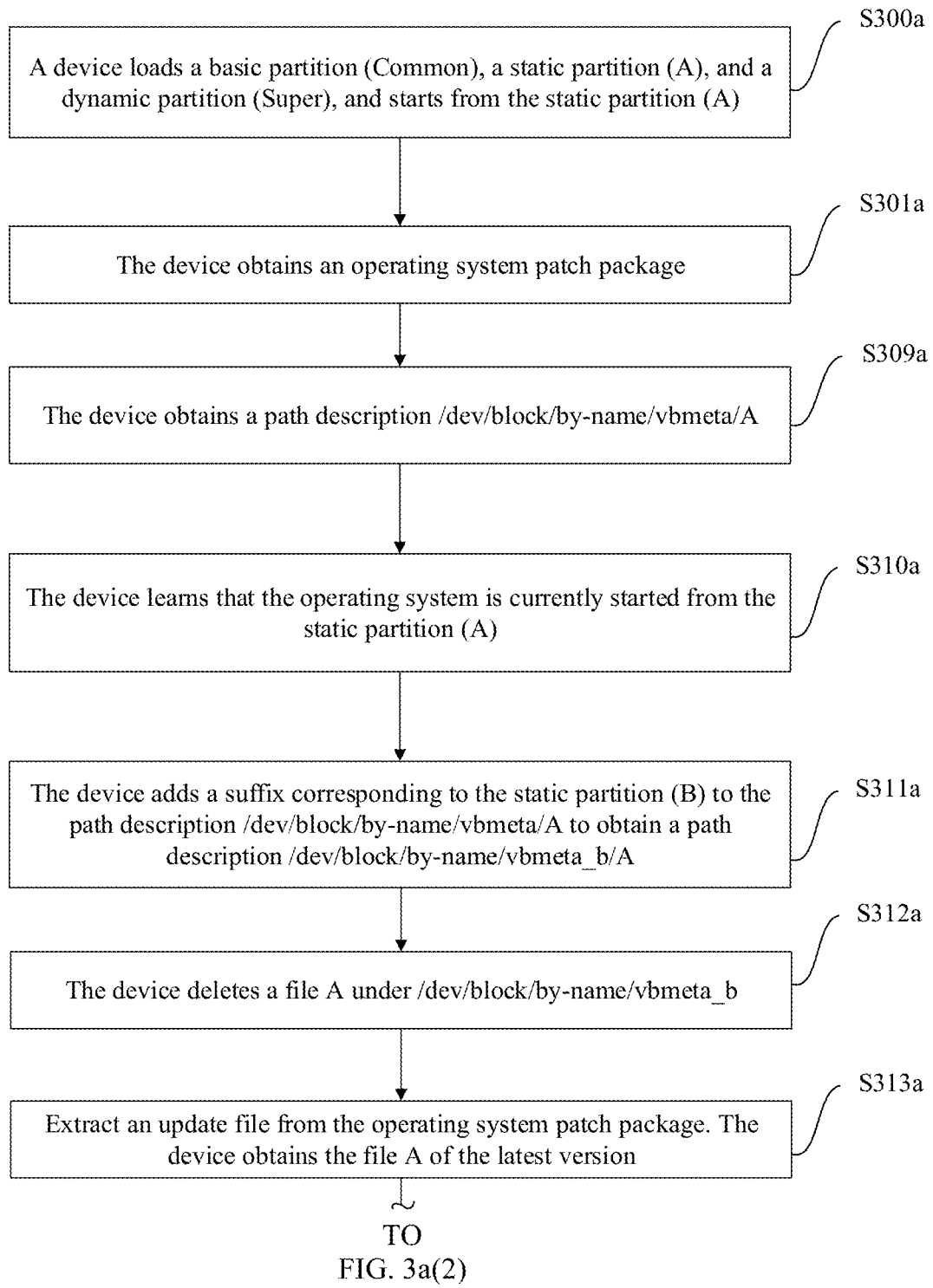
FIG. 3a(1)

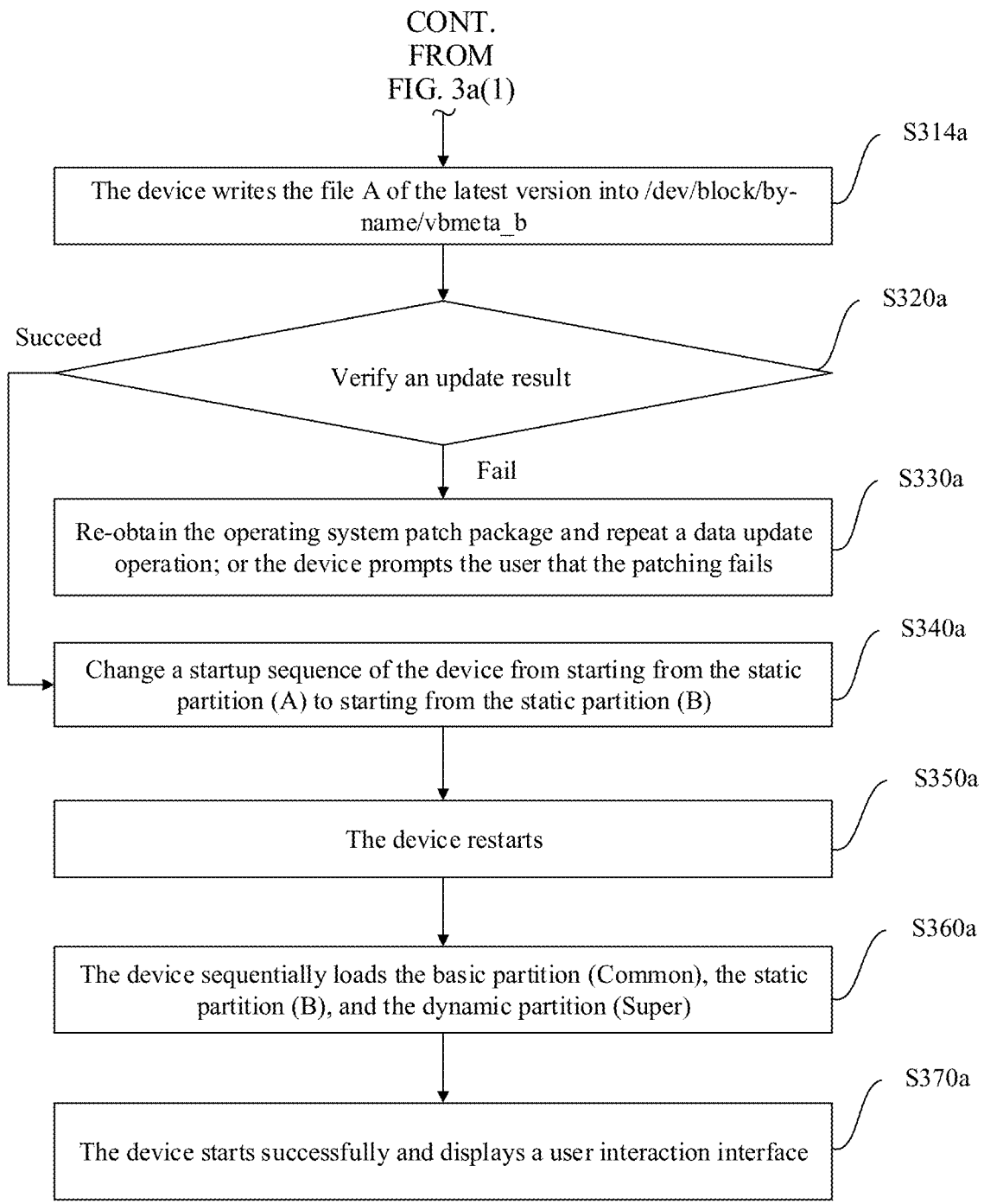
FIG. 3a(2)

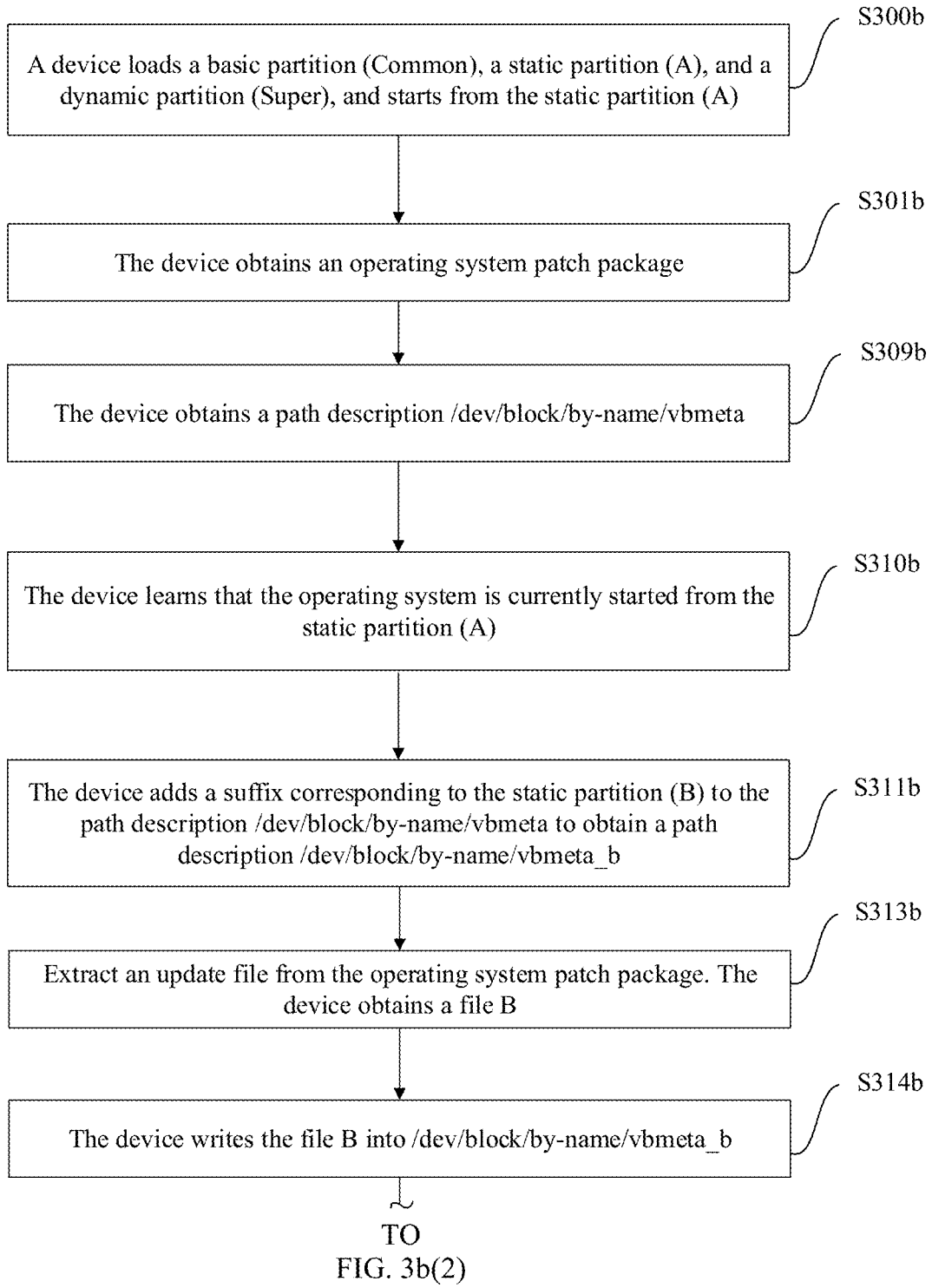
FIG. 3b(1)

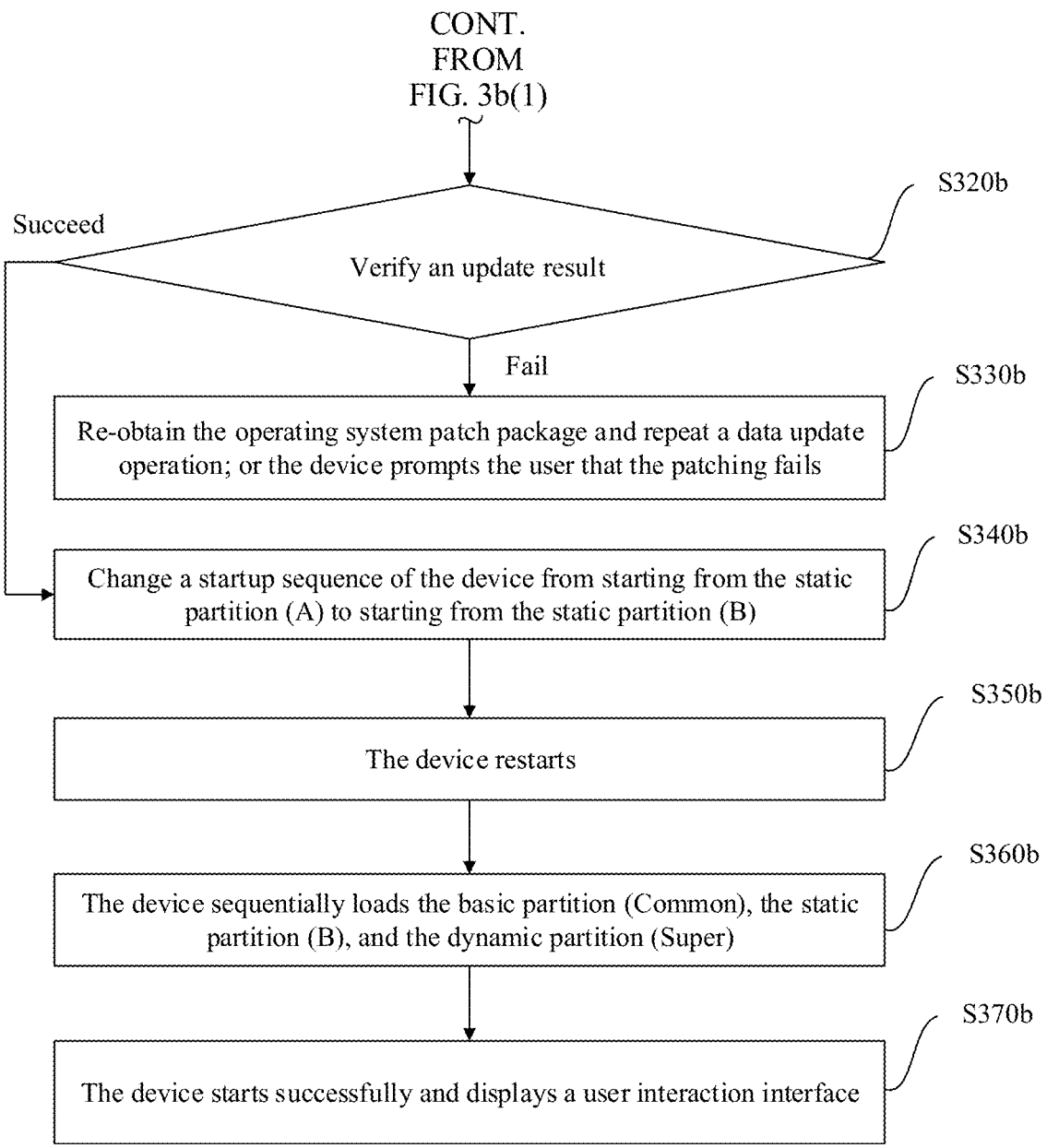
FIG. 3b(2)

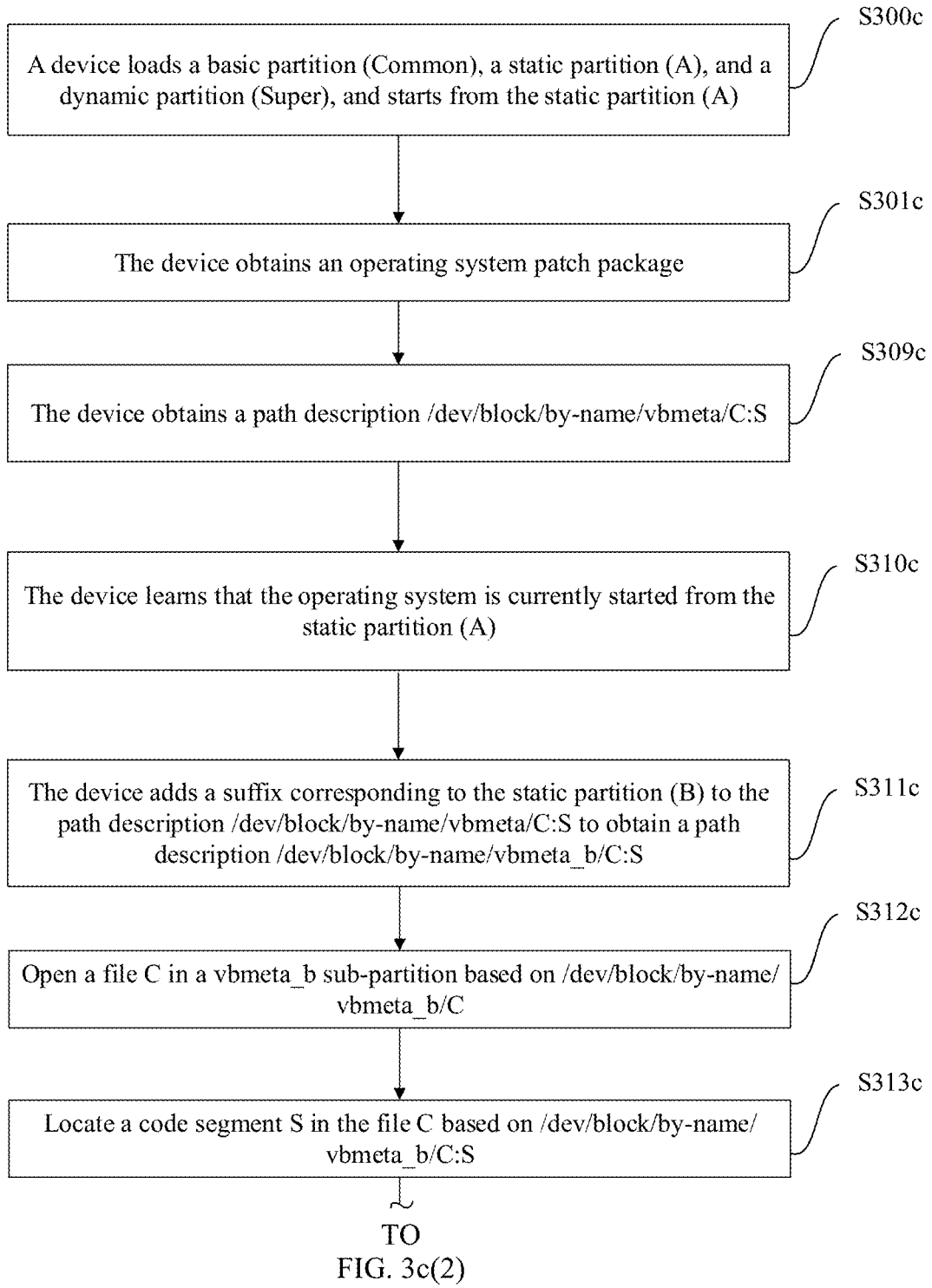
FIG. 3c(1)

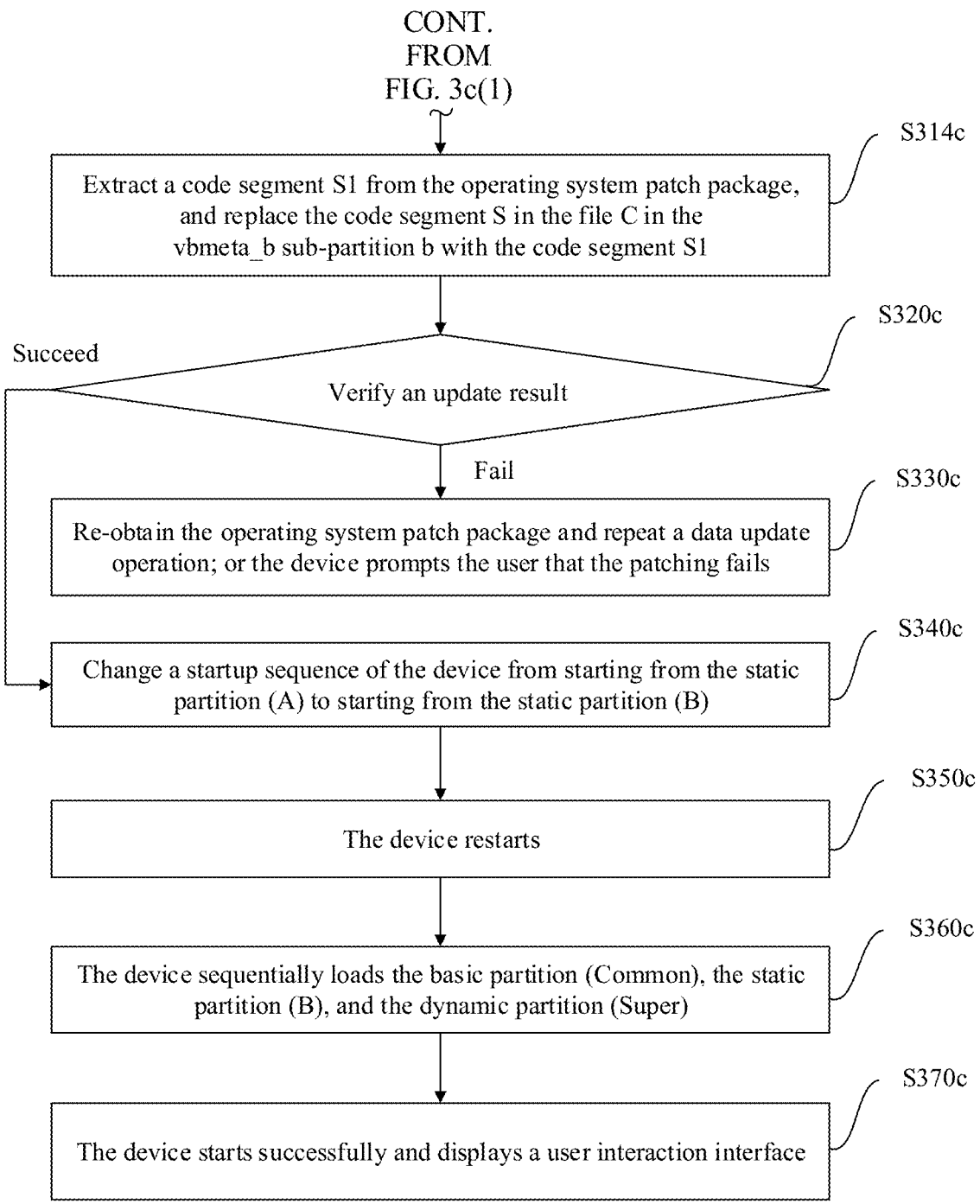
FIG. 3c(2)

UPDATING OPERATING SYSTEM DATA IN A STATIC PARTITION OF AN ELECTRONIC DEVICE

CROSS-REFERECNE TO RELATED APPLICATIONS

This application is a national stage of International Application No. PCT/CN2022/098863, filed on Jun. 15, 2022, which claims priority to Chinese Patent Application No. 202110662973.1, filed on Jun. 15, 2021. The disclosures of both of the aforementioned application are hereby incorporated by reference in their entireties.

TECHNICAL FIELD

This application relates to the field of computer technologies, and in particular, to an operating system data update method, a device, a storage medium, and a computer program product.

BACKGROUND

In an application scenario of a conventional technology, an operating system needs to be installed on a user terminal to be used by a user. For example, a mobile phone operating system (such as an iOS system or an Android system) needs to be installed on a mobile phone to be used by the user.

In an application scenario of the conventional technology, after the operating system is released, system data in the released operating system sometimes needs to be updated. For example, after the operating system is released, an application environment of the operating system changes, and some parameters in the operating system need to be correspondingly updated. For another example, when writing operating system code, a bug (bug) may exist in operating system data due to human error or insufficient consideration of a programmer. Generally, when the operating system is just released, a vendor of the operating system is not aware of a bug that exists in the operating system. In this case, the operating system with the bug is installed on a user terminal. As running data and detection data of an operating system accumulate, the vendor of the operating system detects the bug. In this case, system bug repair needs to be performed on the user terminal on which the operating system with the bug is installed.

Therefore, an operating system data update method is required to update operating system data when there is a requirement for updating operating system data.

SUMMARY

In view of this, this application provides an operating system data update method, a device, a storage medium, and a computer program product, so as to satisfy the requirement for updating operating system data in the conventional technology.

According to a first aspect, an embodiment of this application provides an operating system data update method, applied to an electronic device, where the electronic device includes a processor and a memory; the memory includes a basic partition, a first static partition, a second static partition, a dynamic partition, and a user data partition, the electronic device loads data from the basic partition, the first static partition, and the dynamic partition after starting, to run a first operating system, and after the first operating system runs, the method includes:

obtaining a patch package, where the patch package includes an update positioning description and update data, the update positioning description is used to specify an update target that needs to be updated in a static partition, and the update data is used to describe a data update result of the static partition;

updating data in the second static partition based on the update positioning description and the update data in the patch package;

modifying a startup sequence of the electronic device from starting from the first static partition to starting from the second static partition;

restarting the electronic device, and determining that a current startup sequence is starting from the second static partition;

loading data from the basic partition, the second static partition, and the dynamic partition to run the first operating system with updated static partition data; and before the updating data from the second static partition based on the update positioning description and the update data in the patch package, the method further includes: synchronizing data in the first static partition to the second static partition.

In an implementation of the first aspect, the synchronizing data in the first static partition to the second static partition includes:

reading data in each sub-partition of the first static partition; and rewriting the data in each sub-partition of the first static partition into a corresponding sub-partition of the second static partition.

In an implementation of the first aspect, the synchronizing data in the first static partition to the second static partition includes:

calculating a hash value of data in a third sub-partition, where the third sub-partition is a sub-partition of the first static partition;

calculating a hash value of data in a fourth sub-partition, where the fourth sub-partition is a sub-partition of the second static partition, and the fourth sub-partition corresponds to the third sub-partition; and rewriting the data in the third sub-partition into the fourth sub-partition when the hash value of the data in the third sub-partition is different from the hash value of the data in the fourth sub-partition.

In an implementation of the first aspect, after the obtaining a patch package, synchronizing data in the first static partition to the second static partition is performed.

In an implementation of the first aspect, before the obtaining a patch package, the method further includes:

loading data from the basic partition, the second static partition, and the dynamic partition to run a second operating system;

obtaining an upgrade installation package, where the upgrade installation package includes a static partition upgrade file;

upgrading the data in the first static partition based on the static partition upgrade file;

modifying a startup sequence of the electronic device from starting from the second static partition to starting from the first static partition;

restarting the electronic device, and determining that the current startup sequence is starting from the first static partition;

loading data from the basic partition, the first static partition, and the dynamic partition to run the first operating system; and after the restarting the electronic device, and determining that the current startup sequence is starting from the first static partition, performing, synchronizing data in the first static partition to the second static partition.

In an implementation of the first aspect, in a process of loading the data from the first static partition, after verification of data in the static partition succeeds, synchronizing data in the first static partition to the second static partition is performed.

In an implementation of the first aspect, in a process of loading the data from the dynamic partition, synchronizing data in the first static partition to the second static partition is performed after verification of a to-be-loaded dynamic partition file succeeds.

In an implementation of the first aspect, the upgrade installation package further includes dynamic partition upgrade data;

before the restarting the electronic device, and determining that the current startup sequence is starting from the first static partition, the method further includes: creating a virtual dynamic partition in the user data partition, and storing the dynamic partition upgrade data in the virtual dynamic partition;

the loading data from the basic partition, the first static partition, and the dynamic partition to run the first operating system includes loading the data from the dynamic partition and the dynamic partition upgrade data;

after the loading data from the basic partition, the first static partition, and the dynamic partition to run the first operating system, the method further includes merging the dynamic partition upgrade data to the dynamic partition; and after the merging the dynamic partition upgrade data to the dynamic partition, performing, synchronizing data in the first static partition to the second static partition.

In an implementation of the first aspect, the updating data in the second static partition based on the update positioning description and the update data in the patch package includes:

adding a path correction for the second static partition to the update positioning description.

In an implementation of the first aspect, the update positioning description is a first path pointing to a first file, the update data is a second file, the second file is a file with a same name as the first file, the second file is an update file of the first file, and the updating data in the second static partition based on the update positioning description and the update data in the patch package includes:

adding a directory name suffix corresponding to the second static partition to the first path, to generate a second path;

locating the first file in the second static partition based on the second path;

deleting the first file in the second static partition; and writing the second file into the second path.

In an implementation of the first aspect, the update positioning description is a third path, the update data is a third file, and the updating data in the second static partition based on the update positioning description and the update data in the patch package includes:

adding a directory name suffix corresponding to the second static partition to the third path, to generate a fourth path; and writing the third file into the fourth path.

In an implementation of the first aspect, the update positioning description is a fifth path pointing to a first code segment of a fourth file, the update data is a second code segment, and the updating data in the second static partition based on the update positioning description and the update data in the patch package includes:

adding a directory name suffix corresponding to the second static partition to the fifth path, to generate a sixth path;

locating the fourth file in the second static partition based on the sixth path;

opening the fourth file to locate the first code segment; and rewriting the second code segment into the first code segment.

According to a second aspect, this application further provides an electronic device, where the electronic device includes a processor and a memory, the memory includes a basic partition, a first static partition, a second static partition, a dynamic partition, and a user data partition, and the processor is configured to execute software code stored in the memory; so that the electronic device loads data from the basic partition, the first static partition, and the dynamic partition to run a first operating system after starting, and after the first operating system runs, the electronic device performs the method procedure according to the first aspect.

According to a third aspect, this application further provides a computer-readable storage medium, where the computer-readable storage medium stores a computer program, and when the computer program is run on a computer, the computer is enabled to perform the method according to the first aspect.

According to a fourth aspect, this application further provides a computer program product, where the computer program product includes a computer program, and when the computer program product runs on a computer, the computer is enabled to perform the method according to the first aspect.

According to the foregoing technical solutions provided in the embodiments of this application, at least the following technical effects may be implemented:

According to the method in the embodiments of this application, the data in the static partition can be corrected by using patches without the need to upgrade the entire operating system, thereby greatly reducing difficulty in repairing an operating system, improving efficiency in repairing the operating system, and improving running stability of the operating system.

BRIEF DESCRIPTION OF DRAWINGS

To describe technical solutions in embodiments of this application more clearly, the following briefly describes accompanying drawings required for describing the embodiments. Apparently, the accompanying drawings in the following description show only some embodiments of this application, and a person of ordinary skill in the art may still derive other drawings from these accompanying drawings without creative efforts.

FIG. 3a(1)-FIG. 3a(2) are a flowchart of updating operating system data according to an embodiment of this application:

FIG. 3b(1)-FIG. 3b(2) are a flowchart of updating operating system data according to an embodiment of this application; FIG. 3c(1) FIG. 3c(2) are a flowchart of updating operating system data according to an embodiment of this application:

FIG. 10A-FIG. 9B are a flowchart of an operating system upgrade according to an embodiment of this application.

DESCRIPTION OF EMBODIMENTS

Figure 1:
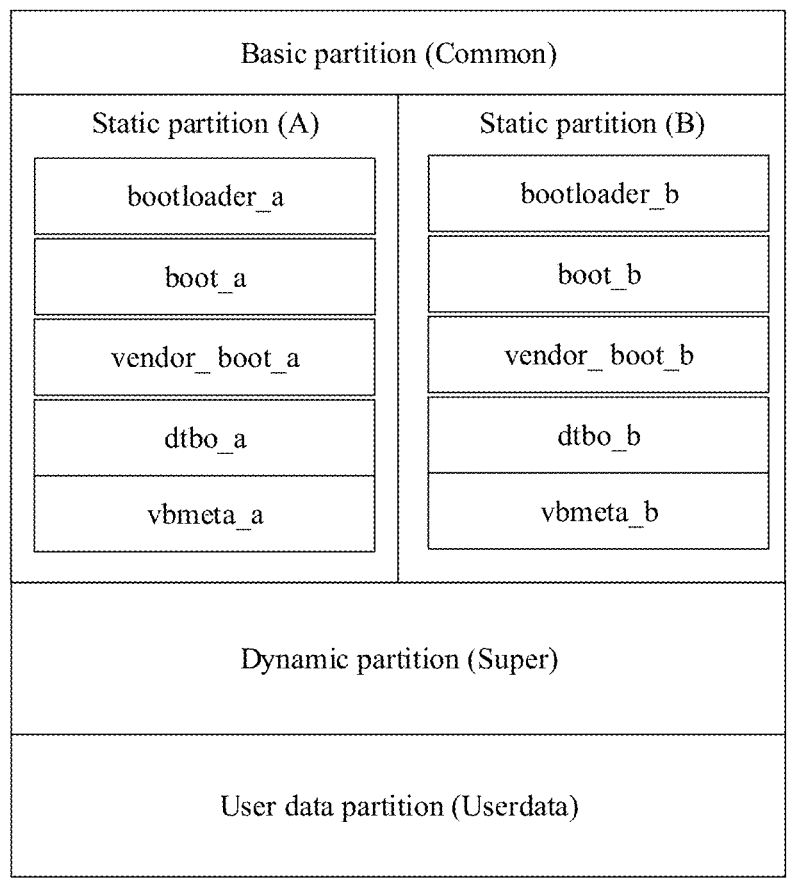
FIG. 1 is a schematic diagram of a data storage structure of an Android system in a virtual A/B upgrade manner on a terminal device.

To better understand the technical solutions of this application, the following describes embodiments of this application in detail with reference to the accompanying drawings.

It should be noted that the described embodiments are merely some rather than all of embodiments of this application. Based on embodiments of this application, all other embodiments obtained by a person of ordinary skill in the art without creative efforts shall fall within the protection scope of this application.

Terms used in embodiments of this application are merely intended to describe specific embodiments, but are not intended to limit this application. The terms "one", "a", "the", "the foregoing", "this", and "the one" of singular forms used in this specification and the appended claims of this application are also intended to include plural forms, unless otherwise specified in the context clearly:

It should be understood that the term "and/or" used in the text merely describes an association relationship between associated objects, and indicates that three relationships may exist. For example, A and/or B may indicate the following cases: Only A exists, both A and B exist, and only B exists. In addition, the character "/" in this specification usually indicates an "or" relationship between the associated objects.

When there is a requirement for updating data of an operating system, a feasible solution is to release a new version of the operating system. A user device periodically initiates a packet search request to a packet search server, where the packet search request includes a version number (for example, version 1.1, and a bug exists in an operating system of version 1.1) of the operating system currently running on the device. The packet search server checks, based on the version number of the operating system in the packet search request, whether an operating system installation package with an updated version number (for example, version 1.2, and the bug in the operating system of version 1.2 is repaired) currently exists. When the operating system installation package of an updated version exists, the packet search server feeds back a download address of the operating system upgrade installation package (for example, an operating system upgrade package used for upgrading from version 1.1 to version 1.2) to the device. The device downloads the operating system upgrade installation package based on the download address of the operating system upgrade installation package. After the system upgrade installation package is downloaded, the operating system is upgraded.

In the foregoing solution, operating system data on the user device can be updated. However, a relatively large amount of data needs to be consumed for downloading the operating system installation package, and system resource and operation time occupied by an operating system upgrade also greatly affect normal use of the device by a user.

Where there is a requirement for updating data of an operating system, another feasible solution is to release a patch file for data update. The patch file is only used to update specified operating system data. For example, an incorrect assignment of a parameter A causes a bug in an operating system, and the patch file includes positioning information of the parameter A and a correct assignment of the parameter A. According to the patch file, only the assignment of the parameter A is updated, and the entire operating system does not need to be upgraded. Because a data volume of a patch file is far less than a data volume of an operating system upgrade installation package, traffic consumption of a user is greatly reduced. In addition, system resource and operation time occupied by an update operation for specified data only are also far less than system resource and operation time occupied when an entire operating system is upgraded. Therefore, impact of a data update operation for the operating system on normal use of a device by the user can be effectively reduced.

However, although updating only the specified data by using the patch file can effectively control download traffic consumption, system resource occupation, and repair time consumption, in a normal condition, the device starts to load the operating system data, and in a running process of the operating system, the loaded operating system data is read-only, for example, when the device runs the operating system normally, a static partition of the operating system is read-only. If data that needs to be updated exists in the static partition, operating system data in the static partition cannot be updated when the device runs the operating system.

To resolve the foregoing problem, this application provides an operating system data update method. The data in the static partition is updated based on A/B partition configuration of the static partition when the device runs normally.

Specifically, FIG. 1 is a schematic diagram of a data storage structure of an Android system in a virtual A/B upgrade manner on a terminal device. As shown in FIG. 1, an Android system data storage area includes a basic partition (Common), a static partition (A), a static partition (B), a dynamic partition (Super), and a user data partition (Userdata).

The user data partition (Userdata) is used to store personal data of a user. For example, personal data such as an APP installed by the user personally, and a picture, a document, and a video stored by the user personally. Data stored in the basic partition is system data that is not used for updating the operating system. A structure of the static partition (A) and a structure of the static partition (B) correspond to each other, and sub-partition names are distinguished from each other by using suffixes _a and _b. The static partition (A) includes bootloader_a, boot_a, vendor_boot_a, dtbo_a, and vbmeta_a; and the static partition (B) includes bootloader_b, boot_b, vendor_boot_b, dtbo_b, and vbmeta_b. The dynamic partition (Super) includes a plurality of sub-partitions.

When the device starts, the device starts from a static partition. For example, when the device starts from the static partition (A), the basic partition (Common), the static partition (A), and the dynamic partition (Super) are sequentially loaded; or when the device starts from the static partition (B), the basic partition (Common), the static partition (B), and the dynamic partition (Super) are sequentially loaded.

In the system storage structure shown in FIG. 1, a partition structure of the static partition (A) is consistent with a partition structure of the static partition (B). When data programmed in the static partition (A) is consistent with data programmed in the static partition (B)(for example, in some application scenarios, after a device performs system installation before the device leaves a factory, data programmed in the static partition (A) is consistent with data programmed in the static partition (B)), the static partition (A) and the static partition (B) may be replaced with each other.

Figure 2:
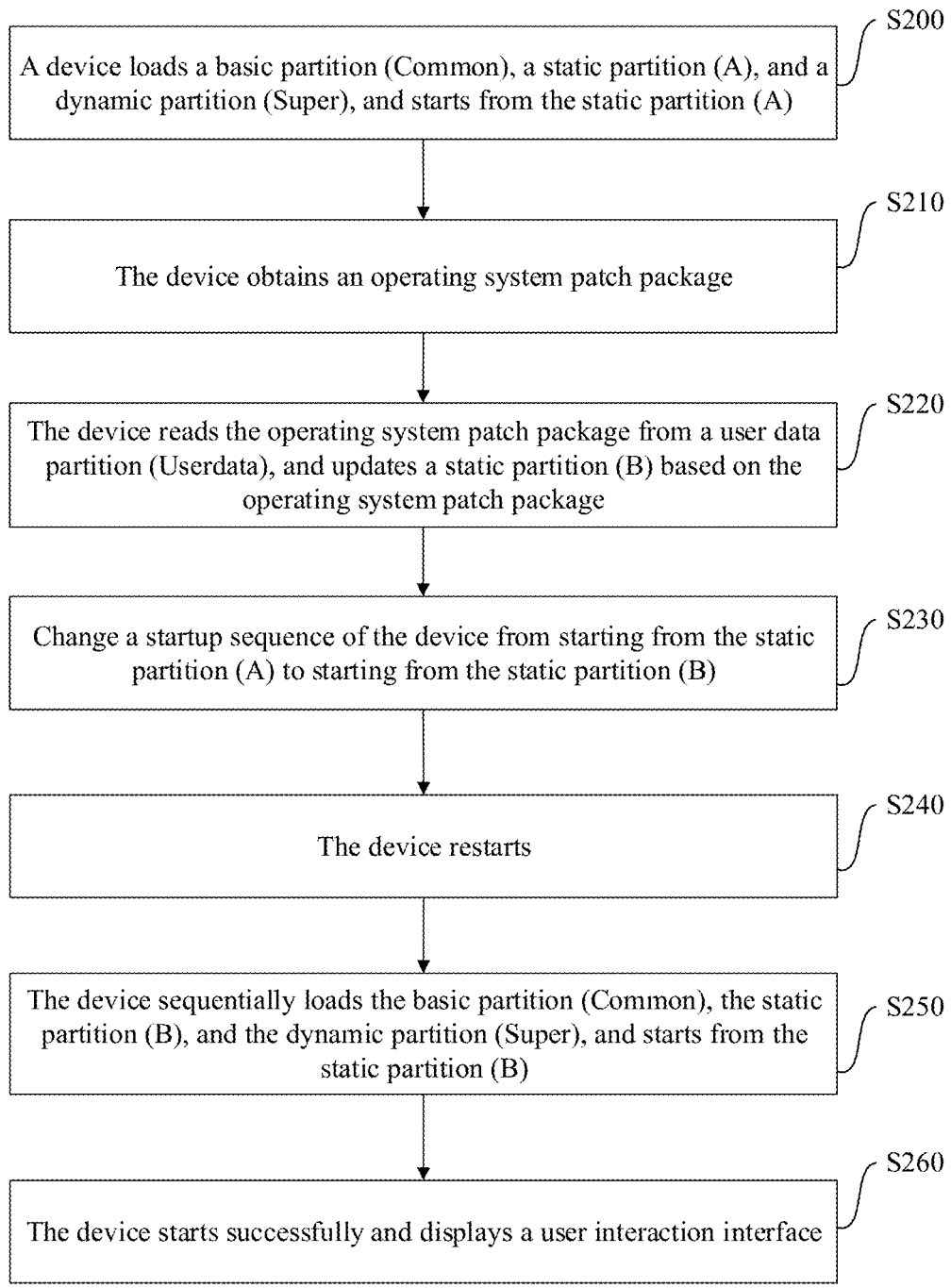
FIG. 2 is a flowchart of updating operating system data according to an embodiment of this application.

FIG. 2 is a flowchart of updating operating system data for the system storage structure shown in FIG. 1 according to an embodiment of this application. The device starts from the static partition (A), and data in the static partition (A) is consistent with data in the static partition (B). The device updates the data in the static partition of the operating system according to the procedure shown in FIG. 2.

S200: A device sequentially loads a basic partition (Common), a static partition (A), and a dynamic partition (Super), and starts from the static partition (A).

S210: The device obtains an operating system patch package.

For example, in a feasible implementation, the device periodically initiates a packet search request to a packet search server, where the packet search request includes a version number (for example, version 1.1) of an operating system currently running on the device. The packet search server checks, based on the version number of the operating system in the packet search request, whether an operating system patch package for the version number exists. When there is an operating system patch package for the version number, the packet search server feeds back a download address of the operating system patch package to the device. The device downloads the operating system patch package based on the download address of the operating system patch package, and stores the operating system patch package to the user data partition (Userdata).

S220: The device reads the operating system patch package from a user data partition (Userdata), and updates a static partition (B) based on the operating system patch package.

S230: Change a startup sequence of the device from starting from the static partition (A) to starting from the static partition (B). For example, a startup sequence identifier of a master boot record (Master Boot Record, MBR) is rewritten, and the startup sequence identifier is rewritten from A to B. After the device is powered on, when the device reads that the startup sequence identifier is A, the device starts from the static partition (A), and loads the static partition (A) during startup; or when the device reads that the start sequence identifier is B, the device starts from the static partition (B), and loads the static partition (B) during startup.

S240: The device restarts. Exit the current operating system, power off the device, and power on the device again.

After S230, the device does not need to restart immediately, and the user can select a restart time.

S250: The device sequentially loads the basic partition (Common), the static partition (B), and the dynamic partition (Super), and starts from the static partition (B).

S260: The device starts successfully and displays a user interaction interface. In this case, static partition data loaded when the operating system runs is updated data.

According to the method in the embodiments of this application, the data in the static partition can be corrected by using patches without the need to upgrade the entire operating system, thereby greatly reducing difficulty in repairing an operating system, improving efficiency in repairing the operating system, and improving running stability of the operating system.

Specifically, in this embodiment of this application, a data structure of the operating system patch package and a manner of updating data in a static partition based on the operating system patch package are not specifically limited. A person skilled in the art may update data in a static partition based on an actual requirement by using operating system patch packages of a plurality of data structures and using a plurality of data update solutions.

FIG. 3a(1)-FIG. 3a(2) are a flowchart of updating operating system data for the system storage structure shown in FIG. 1 according to an embodiment of this application. The device starts from the static partition (A), and data in the static partition (A) is consistent with data in the static partition (B). The operating system patch package includes positioning data used to locate an update object and update data. For example, an update target is to update a file A in a vbmeta sub-partition. The operating system patch package includes a save path description/dev/block/by-name/vbmeta/A of the file A on the device, the file A of the latest version, and a hash value of the vbmeta sub-partition of the latest version.

The device updates the data in the static partition of the operating system according to the procedure shown in FIG. 3a(1)-FIG. 3a(2).

For S300a and S301a, refer to S200 and S210.

S309a: Extract a path description from an operating system patch package. The device obtains a path description/dev/block/by-name/vbmeta/A.

S310a: Identify a current startup sequence of an operating system. The device learns that the operating system currently starts from a static partition (A). For example, refer to S230 to read MBR.

S311a: Correct a path of a to-be-updated file based on the current startup sequence of the operating system. Because the operating system is currently started from the static partition (A), the device adds a suffix corresponding a static partition (B) to the path description/dev/block/by-name/vbmeta/A to obtain a path description/dev/block/by-name/vbmeta_b/A.

S312a: Delete a to-be-updated file. The device deletes a file A under/dev/block/by-name/vbmeta_b.

S313a: Extract an update file from the operating system patch package. The device obtains the file A of the latest version.

S314a: Write the update file. The device writes the file A of the latest version into /dev/block/by-name/vbmeta_b.

S320a: Verify an update result. The device calculates a hash value of a vbmeta_b sub-partition, and compares the calculated hash value with the hash value of the vbmeta sub-partition of the latest version in the operating system patch package.

If the verification fails and the hash values are different, S330a is performed to obtain the operating system patch package again, and S220 to S226 are performed repeatedly; or the device prompts a user that the patching fails, and the user manually detects the failure cause.

If the verification succeeds and the hash values are the same, S340a is performed to change a startup sequence of the device from starting from the static partition (A) to starting from the static partition (B). Specifically, a start identifier in the common partition is rewritten, and the start identifier is rewritten from A to B.

S350a: The device restarts. Exit the current operating system, power off the device, and power on the device again.

After S340a is completed, the device does not need to restart immediately, and the user can select a restart time.

S360a: The device sequentially loads the basic partition (Common), the static partition (B), and the dynamic partition (Super).

S370a: The device starts successfully and displays a user interaction interface. In this case, data in the static partition loaded by the device is updated data of the latest version.

For another example, FIG. 3a(1)-FIG. 3a(2) are a flowchart of updating operating system data for the system storage structure shown in FIG. 1 according to an embodiment of this application. The device starts from the static partition (A), and data in the static partition (A) is consistent with data in the static partition (B). The operating system patch package includes positioning data used to locate an update object and update data. For example, the update target is to add a file B to the vbmeta sub-partition. The operating system patch package includes a save path description /dev/block/by-name/vbmeta of the file B on the device, the file B, and the hash value of the vbmeta sub-partition of the latest version.

The device updates the data in the static partition of the operating system according to the procedure shown in FIG. 3b(1)-FIG. 3b(2).

For S300b and S301b, refer to S200 and S210.

S309b: Extract a path description from an operating system patch package. The device obtains a path description/dev/block/by-name/vbmeta.

S310b: Identify a current startup sequence of an operating system. The device learns that the operating system is currently started from a static partition (A).

S311b: Correct a path of a to-be-updated file according to a current start sequence of an operating system. Because the operating system is currently started from a static partition (A), the device adds a suffix of a corresponding static partition (B) to a path description/dev/block/by-name/vbmeta to obtain a path description/dev/block/by-name/vbmeta_b. Since the path description/dev/block/by-name/vbmeta does not point to a specific file, the device does not need to delete a file in a static partition (B).

S313b: Extract an update file from the operating system patch package. The device obtains the file B.

S314b: Write the update file. The device writes the file B into/dev/block/by-name/vbmeta_b.

For S320b to S370b, refer to S320a to S361a.

For another example, FIG. 3c(1)-FIG. 3c(2) are a flowchart of updating operating system data for the system storage structure shown in FIG. 1 according to an embodiment of this application. The device starts from the static partition (A), and data in the static partition (A) is consistent with data in the static partition (B). The operating system patch package includes positioning data used to locate an update object and update data. For example, the update target is to replace a code segment S in a file C in the vbmeta sub-partition with S1. The operating system patch package includes a saving path description/dev/block/by-name/vbmeta/C:S of the file C on the device, a code segment S1, and a hash value of the vbmeta sub-partition of the latest version.

The device updates the data in the static partition in the operating system according to the procedure shown in FIG. 3c(1)-FIG. 3c(2).

For S300c and S301c, refer to S200 and S210.

S309c: Extract a path description from an operating system patch package. The device obtains a path description/dev/block/by-name/vbmeta/C:S.

S310c: Identify a current startup sequence of an operating system. The device learns that the operating system is currently started from a static partition (A).

S311c: Correct a path of a to-be-updated file based on a current start sequence of the operating system. Because the operating system is currently started from the static partition (A), the device adds a suffix corresponding to the static partition (B) to a path description/dev/block/by-name/vbmeta/C:S to obtain a path description/dev/block/by-name/vbmeta_b/C:S. Because the path description/dev/block/by-name/vbmeta/C:S points to a code segment in a specific file, the device performs S312c.

S312c: Open a file C in a vbmeta_b sub-partition based on/dev/block/by-name/vbmeta_b/C.

S313c: Locate a code segment S in the file C based on/dev/block/by-name/vbmeta_b/C:S. For example, the S in/dev/block/by-name/vbmeta_b/C:S is matched with code in the file C, and a code segment consistent with the S in the code in the file C is searched.

S314c: Extract a code segment S1 from the operating system patch package, and replace the code segment S in the file C in the vbmeta_b sub-partition b with the code segment S1.

For S320c to S370c, refer to S320a to S361a.

Figure 4:
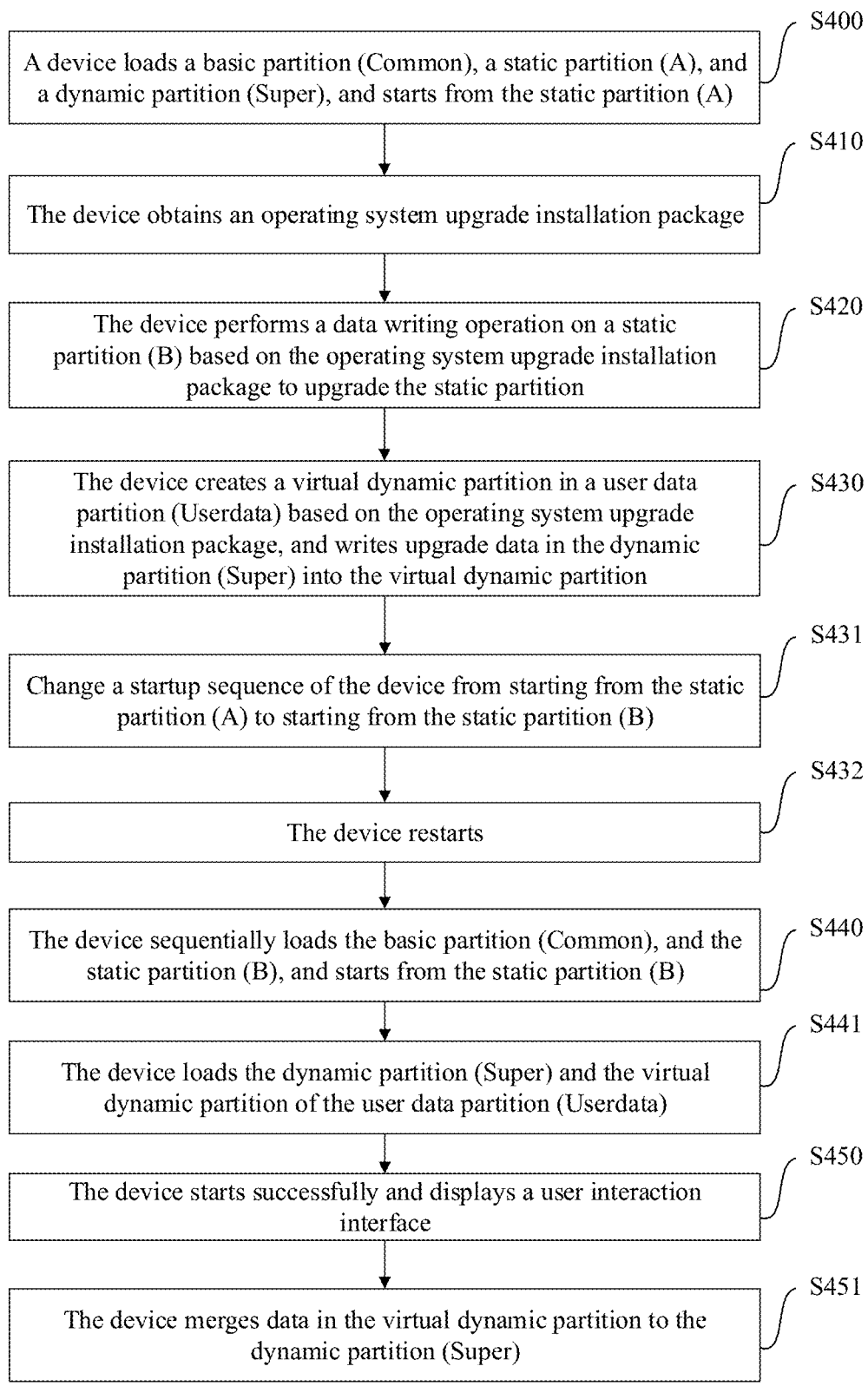
FIG. 4 is a flowchart of an operating system upgrade according to an embodiment of this application.

Further, after the device leaves the factory, in an actual application scenario, the device still has upgrade requirements. FIG. 4 is a flowchart of an operating system upgrade for the system data storage structure shown in FIG. 1. When the device currently starts from the static partition (A), the device implements an operating system upgrade according to a procedure shown in FIG. 4.

S400: A device sequentially loads a basic partition (Common), a static partition (A), and a dynamic partition (Super), and starts from the static partition (A).

S410: The device obtains an operating system upgrade installation package.

For example, in a feasible implementation, the device periodically initiates a packet search request to a packet search server, where the packet search request includes a version number (for example, version 1.1) of an operating system that is currently running on the device. The packet search server checks, based on the operating system version number in the packet search request, whether an operating system installation package with an updated version number (for example, version 1.2) currently exists. When the operating system installation package with an updated version exists, the packet search server feeds back a download address of the operating system upgrade installation package (for example, a system incremental upgrade installation package used for upgrading from version 1.1 to version 1.2) to the device. The device downloads the operating system upgrade installation package based on the download address of the operating system upgrade installation package, and saves the operating system upgrade installation package to the user data partition (Userdata).

S420: The device performs a data writing operation on a static partition (B) based on the operating system upgrade installation package to upgrade the static partition.

For example, the system incremental upgrade installation package used for upgrading from version 1.1 to version 1.2 includes full data in the static partition of version 1.2, and the device rewrites the data in the static partition of version 1.2 into the static partition (B).

S430: The device creates a virtual dynamic partition in a user data partition (Userdata) based on the operating system upgrade installation package, and writes upgrade data in the dynamic partition (Super) into the virtual dynamic partition. For example, the operating system upgrade installation package includes data in the dynamic partition of version 1.2, and the device writes the data in the dynamic partition (Super) of version 1.2 into the virtual dynamic partition.

Further, in a virtual A/B upgrade solution, an incremental upgrade manner is used for the dynamic partition (Super). During the upgrade process, the virtual dynamic partition of the user data partition (Userdata) stores not all files of the dynamic partition (Super) of a new version after upgrade, but an upgrade result of the data that needs to be upgraded in the dynamic partition (Super) of the old version after upgrade. That is, update data in the dynamic partition is stored in the virtual dynamic partition of the user data partition (Userdata).

A "system" sub-partition is used as an example. It is assumed that in version 1.1, data in the "system" sub-partition may be divided into two parts: system1 and system2. In case of upgrade from version 1.1 to version 1.2, the data system2 does not change, and the data system1 is upgraded to system3. Therefore, in S430, the device creates a virtual dynamic partition in the user data partition (Userdata), and writes the data system3 into the virtual dynamic partition.

For example, the system incremental upgrade installation package used for upgrading from version 1.1 to version 1.2 includes dynamic partition (Super) update data used for upgrading from version 1.1 to version 1.2, and the dynamic partition (Super) update data includes the data system3.

Further, in the virtual A/B upgrade solution, incremental upgrade of the dynamic partition (Super) is implemented based on a snapshot (snapshot) technology. Specifically, in the virtual dynamic partition of the user data partition (Userdata), the upgrade data in the dynamic partition (Super) is stored by using a Copy-On-Write (Copy-On-Write, COW) file.

Specifically, the upgrade data in the dynamic partition (Super) stored in the user data partition (Userdata) includes a plurality of COW files, each COW file is corresponding to a sub-partition of a dynamic partition (Super), and a name of the COW file is corresponding to a sub-partition of the dynamic partition (Super) specific to the COW file.

In the operating system upgrade installation package obtained in S410, the COW file of the upgrade data in the dynamic partition (Super) is compressed and stored in the form of binary code. In the operating system upgrade installation package, each COW file is named based on a dynamic partition (Super) sub-partition specific to the COW file. For example, a COW file specific to the "system" sub-partition is named system-cow-img.img.0000.

In S430, the device unpacks the operating system upgrade installation package to obtain all COW files, and appends an A/B partition tag to each COW file. Specifically, when the device currently starts from the static partition (A), it may be understood that a dynamic partition (Super) loaded by the device currently when running the operating system is the dynamic partition (A). When the operating system is being upgraded, the virtual dynamic partition created in the user data partition (Userdata) specific to the dynamic partition (B). Therefore, a name mark_b corresponding to the dynamic partition (B) is appended to the COW file. For example, _b is appended to system-cow-img.img.0000 to generate system_b-cow-img.img.0000.

Further, in S430, an Update folder is created in the user data partition (Userdata), and the renamed COW file is stored in the Update folder. For example, in an application scenario, after the COW file is written into the user data partition (Userdata), the Update folder in the user data partition (Userdata) includes the following files:
  system_b-cow-img.img.0000;
  system_ext_b-cow-img.img.0000;
  vendor_b-cow-img.img.0000;
  product_b-cow-img.img.0000;
  cust_b-cow-img.img.0000;
  odm_b-cow-img.img.0000.

Specifically, the COW file includes a COW file map (snapshot map) of the COW file and upgrade data.

The COW file map (snapshot) corresponds to a file map of the sub-partition of the dynamic partition (Super) specific to the COW file. The file map of the sub-partition of the dynamic partition (Super) is used to describe all files in the sub-partition of the dynamic partition (Super) of a current version of the operating system (version prior to the upgrade, for example, version 1.1) and a storage address of each file.

The upgrade data in the COW file is an updated file in the sub-partition data of a new version compared with the sub-partition data of a current version. The COW file map of the COW file is used to describe a correspondence between the updated file and the file in the sub-partition of the current version and a storage address of the updated file.

Based on the file map of the sub-partition of the dynamic partition (Super) and the COW file map of the COW file, upgrade data in the COW file may be used to replace the corresponding file in the sub-partition of the dynamic partition (Super), thereby implementing an upgrade of the dynamic partition (Super) data. Specifically, when the file map of the sub-partition of the dynamic partition (Super) needs to be obtained, a snapshot operation may be performed on the data in the sub-partition of the dynamic partition (Super) based on the snapshot, so as to generate the file map of the sub-partition of the dynamic partition (Super). The file map of the sub-partition of the dynamic partition (Super) may also be generated in advance when creating the operating system upgrade installation package, and the file map is added to the COW file.

The "system" sub-partition is used as an example. It is assumed that the "system" sub-partition stores data in the following paths:
  /system/app/A0.XXX;
  /system/app/A1.XXX;
  /system/app/A2.XXX;
  /system/B0.XXX;
  /system/B1.XXX;
  /system/user/C0.XXX;
  /system/user/C1.XXX;
  /system/user/C2.XXX;
  /system/user/C3.XXX.

A file map of the "system" sub-partition may be as follows:
  /system/app/A0.XXX: 024010~024013;
  /system/app/A1.XXX: 024014~024017;
  /system/app/A2.XXX: 024018~024020;
  /system/B0.XXX: 024021~024026;
  /system/B1.XXX: 024027~024028;
  /system/user/C0.XXX: 024029~024032;

/system/user/C1.XXX: 024033~024035;
/system/user/C2.XXX: 024036~024040;
/system/user/C3.XXX: 024041~024044.

Numbers following the file name (for example, 024010~024013 in/system/app/A0.XXX: 024010~024013) indicate a physical storage address (block address) of the file in the "system" sub-partition of the dynamic partition (Super).

It is assumed that data in/system/app/A2.XXX and/system/user/C2.XXX needs to be updated when the current operating system is being upgraded.

It can be considered that:
/system/app/A2.XXX and/system/user/C2.XXX are system1 in the data of the "system" sub-partition; and
/system/app/A0.XXX, /system/app/A1.XXX, /system/B0.XXX, /system/B1.XXX, /system/user/C0.XXX, /system/user/C1.XXX and/system/user/C3.XXX are system2 in the data of the "system" sub-partition.

Then, the COW file (system_b-cow-img.img.0000) specific to the "system" sub-partition includes the latest version of/system/app/A2.XXX and/system/user/C2.XXX.

It may be considered that/system/app/A2.XXX and/system/user/C2.XXX of the latest version are system3. A purpose of the upgrade is to use the system3 to update system1.

When a size of updated data in the COW file is the same as a size of original data to be updated, and a storage address of the updated data in the COW file in the sub-partition after the data is updated is the same as a storage address of the original data to be updated in the sub-partition, the COW file map of the COW file (system_b-cow-img.img.0000) may be:

/system/app/A2.XXX:
Map1 (address of data to be updated in an original super partition): start address address start: 024018 (offset relative to a system start address); offset size size: 2 (that is, data of the 024018~024020 address segment)
Map2 (address of the update data stored in the cow file): start address address start: 045033 (offset relative to the start address stored in the cow file); offset size size: 2 (that is, data of the 045033~045035 address segment);
/system/user/C2.XXX:
Map1 (address of data to be updated in an original super partition): start address address start: 024036 (offset relative to a system start address); offset size size: 4 (that is, data of the 024036~024040 address segment)
Map2 (address of the update data stored in the cow file): start address address start: 045036 (offset relative to the start address stored in the cow file); offset size size: 4 (that is, data of the 045036~045040 address segment).

When the size of the updated data in the COW file is inconsistent with the size of the original data to be updated, the COW file map of the COW file (system_b-cow-img.img.0000) may be:

/system/app/A2.XXX:
Map1.1 (address of the to-be-updated data in the original super partition): Start address address start: 024018 (offset relative to a system start address); offset size size: 2 (that is, data of the 024018~024020 address segment)
Map2.1 (address of the update data that needs to be rewritten with the Map1.1 address stored in the cow file): start address address start: 045033 (offset relative to the start address stored in the cow file); offset size size: 2 (that is, data of the 045033~045035 address segment);
Map1.2 (the to-be-written address of the part of the cow file whose update data exceeds the size of the to-be-updated data in the original super partition): start address address start: 025018 (offset relative to a system start address); offset size size: 1 (that is, data of the 025018~025020 address segment)
Map2.2 (address in the updated data that is stored in the cow file and that needs to be used to rewrite Map1.2): start address address start: 046033 (offset relative to the start address stored in the cow file); offset size size: 2 (that is, data of the 046033~046035 address segment).

In the following description of the specification, for ease of description, only an application scenario in which the size of updated data in the COW file is the same as the size of original data to be updated by the COW file, and a storage location of the updated data in the sub-partition after the data is updated is the same as a storage location of the original data in the sub-partition is used as an example.

In the foregoing example, the address segments (045033~045035 and 045036~045040) are respectively /system/app/A2.XXX in the COW file (system_b-cow-img.img.0000) and the physical storage address (block address) of the/system/user/C2.XXX in the user data partition (Userdata) of the latest version.

In this way, if A2.XXX under the address 045033~045035 is used to replace A2.XXXunder the address 024018~024020, and C2.XXX under the address 045036~045040 is used to replace C2.XXX under the address 024036~024040, data upgrade of the "system" sub-partition of the dynamic partition (Super) can be completed.

Further, in S430, after the COW file is written into the user data partition (Userdata), the dynamic partition (Super) and the COW file need to be verified as a whole to verify validity of the dynamic partition (Super) and the COW file, and verify whether a result of merging the dynamic partition (Super) data of a current version and the COW file is dynamic partition (Super) data of a new version.

Specifically, upgrading from version 1.1 to version 1.2 is used as an example. A hash value of a result merging data that does not need to be upgraded (data that does not change from version 1.1 to version 1.2) in the dynamic partition (Super) and data that needs to be upgraded (data that needs to be upgraded from version 1.1 to version 1.2) in the COW file is calculated to determine whether the hash value is the same as a hash value of complete data in the dynamic partition (Super) of version 1.2. If the two are the same, it indicates that the COW file is valid. If the two are different, it indicates that the COW file is invalid, the upgrade fails, the upgrade process is interrupted, and an error is reported. The hash value of the complete data in the dynamic partition (Super) of version 1.2 is stored in the operating system upgrade installation package.

Specifically, in a verification process, the dynamic partition (Super) and the COW file are merged based on the snapshot. In an implementation process of the snapshot, merging of the dynamic partition (Super) and the COW file is not physical merging, but merging of a whole file map of the "system" sub-partition and the COW file map of the COW file to generate a file map of sub-partition data of a new version.

For example, the file map of the "system" sub-partition:
/system/app/A0.XXX: 024010~024013;
/system/app/A1.XXX: 024014~024017;
/system/app/A2.XXX: 024018~024020;
/system/B0.XXX: 024021~024026;
/system/B1.XXX: 024027~024028;
/system/user/C0.XXX: 024029~024032;

/system/user/C1.XXX: 024033~024035;
/system/user/C2.XXX: 024036~024040;
/system/user/C3.XXX: 024041~024044.
is merged with the COW file map:
/system/app/A2.XXX:
Map1: address start: 024018; size: 2 (that is, data of the 024018~024020 address segment)
Map2: address start: 045033; size: 2 (that is, data of the 045033~045035 address segment);
/system/user/C2.XXX:
Map1: address start: 024036; size: 4 (that is, data of the 024036~024040 address segment)
Map2: address start: 045036; size: 4 (that is, data of the 045036~045040 address segment). to obtain a file map of a new version of the "system" sub-partition:
/system/app/A0.XXX: 024010~024013;
(Point to A0.XXX under/system/app in the dynamic partition (Super))
/system/app/A1.XXX: 024014~024017;
(Point to A1.XXX under/system/app in the dynamic partition (Super))
/system/app/A2.XXX: 045033~045035;
(Point to A2.XXX in/Update/system_b-cow-img.img.0000 in the user data partition (Userdata))
/system/B0.XXX: 024021~024026;
(Point to B0.XXX under/system in the dynamic partition (Super))
/system/B1.XXX: 024027~024028;
(Point to B1.XXX under/system in the dynamic partition (Super))
/system/user/C0.XXX: 024029~024032;
(Point to C0.XXX under/system/user in the dynamic partition (Super))
/system/user/C1.XXX: 024033~024035;
(Point to C1.XXX under/system/user in the dynamic partition (Super))
/system/user/C2.XXX: 045036~045040;
(Point to C2.XXX in/Update/system_b-cow-img.img.0000 in the user data partition (Userdata))
/system/user/C3.XXX: 024041~024044.
(Point to C3.XXX under/system/user in the dynamic partition (Super))

In the file map of the new version of the "system" sub-partition, a storage address of /system/app/A2.XXX does not point to/system/app/A2.XXX in the dynamic partition (Super) in the memory, but to A2.XXX in system_b-cow-img.img.0000 in the user data partition (Userdata) in the memory. The storage address of/system/user/C2.XXX does not point to/system/user/C2.XXX in the dynamic partition (Super) in the memory, but to C2.XXX in the system_b-cow-img.img.0000 in the user data partition (Userdata) in the memory.

In a verification process, file maps of a new version of all sub-partitions of the dynamic partition (Super) are obtained in the foregoing merging manner (if a corresponding COW file of a sub-partition is not written into the user data partition (Userdata), a file map of the sub-partition is directly used as the file map of a new version). File maps of a new version of all sub-partitions are merged to generate a file system of a new version of the dynamic partition (Super).

The file system of a new version based on the dynamic partition (Super) reads data, reads all files included in the file system of a new version of the dynamic partition (Super), and calculates a hash value.

When the COW file is valid, merging status information in metadata partition (/metadata) of the basic partition (Common) is changed from "merged (merged)" to "wait for merge (wait for merge)". The merging status information is used to indicate whether there is a COW file that needs to be merged to the dynamic partition (Super). Specifically, the merging status information includes an overall identifier specific to the dynamic partition (Super) and a sub-partition identifier specific to each sub-partition. When the overall identifier is "merged (merged)", a merging operation needs to be performed on all sub-partitions representing the dynamic partition (Super) do not need a merging operation. When the overall identifier is "wait for merge (wait for merge)", a merging operation needs to be performed on one or more sub-partitions representing the dynamic partition (Super). When the sub-partition identifier is "merged (merged)", it indicates that no merging operation needs to be performed on the sub-partition. When the sub-partition identifier is "wait for merge (wait for merge)", it indicates that a merging operation needs to be performed on the sub-partition.

S431: Change a startup sequence of the device from starting from the static partition (A) to starting from the static partition (B).

For example, a start sequence identifier of a master boot record (Master Boot Record, MBR) is rewritten, and the start sequence identifier is rewritten from A to B. After the device is powered on, when the device reads that the startup sequence identifier is A, the device starts from the static partition (A), and loads the static partition (A) during startup; or when the device reads that the start sequence identifier is B, the device starts from the static partition (B), and loads the static partition (B) during startup.

S432: The device restarts. Exit the current operating system, power off the device, and power on the device again.

S440: The device sequentially loads the basic partition (Common) and the static partition (B).

S441: The device loads the dynamic partition (Super) and the virtual dynamic partition of the user data partition (Userdata).

Specifically, the device reads the merging status information in the metadata (/metadata), determines, based on the merging status information, whether to retrieve the COW file from a specified path of the user data partition (Userdata), and merges and loads the dynamic partition (Super) and the COW file by using the snapshot.

Further, in S441, the device does not load all COW files in the dynamic partition (Super) and the user data partition (Userdata), but loads a corresponding file based on the operating system running requirement. Specifically, in S441, the device determines, based on the operating system running requirement, a file that needs to be loaded, and extracts, based on the snapshot, a corresponding file from the COW file in the dynamic partition (Super) or the virtual dynamic partition for loading.

Specifically, in S441, when a corresponding COW file exists in the sub-partition of the dynamic partition (Super), a file map of a new version of each sub-partition of the dynamic partition (Super) is first generated based on the snapshot. For a process of generating a file map of a new version, refer to S430. The device determines a to-be-loaded file based on the operating system running requirement, and loads the file based on the file map of a new version of the sub-partition of the dynamic partition (Super).

For example, when the operating system runs, all data in a directory "user (/system/user)" under the "system" sub-partition needs to be loaded. The device reads the merging status information in the metadata (/metadata), and the sub-partition identifier of the "system" sub-partition in the merging status information is "wait for merge (wait for merge)". Therefore, the device searches for the COW file in /Update of the user data partition (Userdata), and after detecting the COW file system_b-cow-img.img.0000 in the Update, generates the file map of the new version of the "system" sub-partition based on the snapshot and the file map of the COW file in the system_b-cow-img.img.0000. The data is loaded based on storage addresses of all files under /system/user in the file map of the new version of the "system" sub-partition. For example, based on the file map of the new version of the "system" sub-partition:

/system/user/C0.XXX: 024029~024032;
/system/user/C1.XXX: 024033~024035;
/system/user/C2.XXX: 045036~045040;
/system/user/C3.XXX: 024041~024044.

C0.XXX under address 024029~024032, C1.XXX under address 024033~024035, C2.XXX under address 045036~045040, and C3.XXX under address 024041~024044 are loaded.

Further, when all data in the directory "user (/system/user)" under the "system" sub-partition is being loaded, if the sub-partition identifier of the "system" sub-partition in the merging status information is "merged (merged)", the device does not search for the COW file in the /Update in the user data partition (Userdata), but directly loads all data in the directory "user (/system/user)" under the "system" sub-partition.

Further, when all data in the directory "user (/system/user)" under the "system" sub-partition is loaded, when the sub-partition identifier of the "system" sub-partition in the "system" sub-partition in the merging status information is "wait for merge (wait for merge)", if the device does not find a COW file corresponding to the "system" sub-partition in the user data partition (Userdata) /Update, it indicates a data writing error (COW file writing error or writing error in the merging status information) in an upgrade process, and in this case, the device rolls back and reports an error.

Further, in S441, before loading a file, the device further needs to verify the to-be-loaded file. Different from S430, in S441, the dynamic partition (Super) and the COW file are not verified as a whole, but only the file that needs to be loaded is verified. For example, verification is performed based on dmverity (dm-verity is a target (target) of dm (device mapper), is a virtual block device, and is specifically used for verification of a file system). If the verification succeeds, the file is loaded. If the verification fails, the device is restarted, and the system is rolled back or the device attempts to reload the file.

S450: The device starts successfully and displays a user interaction interface.

S451: The device merges data in the virtual dynamic partition to the dynamic partition (Super).

In the description of the specification of this application, a merging operation means that in an operating system upgrade process, a dynamic partition (Super) upgrade file (COW file) stored in a virtual dynamic partition of the user data partition (Userdata) is written into the dynamic partition (Super), to upgrade data in the file in the dynamic partition (Super), so that the device does not need to load the dynamic partition (Super) and the virtual dynamic partition at a next startup, and device startup may be completed only by loading the dynamic partition (Super).

Specifically, the device performs a power-on broadcast after a successful startup, and starts an upgrade process after the power-on broadcast. The upgrade process reads the merging status information in the metadata (/metadata) of the basic partition (Common). If the merging status information is "merged (merged)", the device enters a normal running mode.

If the merging status information is "wait for merge (wait for merge)", the upgrade process merges the COW file in the user data partition (Userdata) to the dynamic partition (Super).

Specifically, in the upgrade process, the upgrade data in the COW file in the user data partition (Userdata) is written into a corresponding address in the dynamic partition (Super), so that all data in the dynamic partition (Super) is data of a new version after upgrade.

For example, data under address 045033~045035 is written into address 024014~024017 based on /system/app/A2.XXX: 024018~024020 in the file map of the "system" sub-partition and /system/app/A2.XXX: 045033~045035 in the COW file map, and data under address 045036~045040 is written into address 024036~024040 based on /system/user/C2.XXX: 024036~024040 in the file map of the "system" sub-partition and /system/user/C2.XXX: 045036~045040 in the COW file map.

After that, in the upgrade process, the COW file in the user data partition (Userdata) is deleted, and storage space is returned to the user data partition (Userdata). In addition, the merging status information in the metadata (/metadata) of the basic partition (Common) is changed from "wait for merge (wait for merge)" to "merged (merged)".

In S420, a data operation of a static partition upgrade is specific to operating system data in the static partition (B), which does not affect operating system data in a currently started static partition (A). In addition, in S430, a data operation of a dynamic partition upgrade is completed on the virtual dynamic partition created in the user data partition (Userdata), which does not affect the currently mounted dynamic partition (Super). Therefore, in an entire operating system upgrade process, the user may normally use the device. In addition, after S431 is completed, the device does not need to restart immediately, and the user may select a restart time. In this way, an upgrade process of the operating system does not affect a normal mobile phone operation of the user, thereby greatly improving user experience. Further, for the dynamic partition (Super), a virtual dynamic partition is created in the user data partition (Userdata) only when an upgrade needs to be performed. Therefore, utilization of data storage space is effectively improved.

In some application scenarios, after the device performs an operating system upgrade based on the procedure shown in FIG. 4, a version difference exists between a static partition (B) and a static partition (A), and data in the static partition (A) and data in the static partition (B) may be inconsistent. In this way, if the device starts from the static partition (B) currently, when data in a current operating system of a device needs to be updated, a patching operation cannot be directly performed on the data in the static partition (A).

Figure 5:
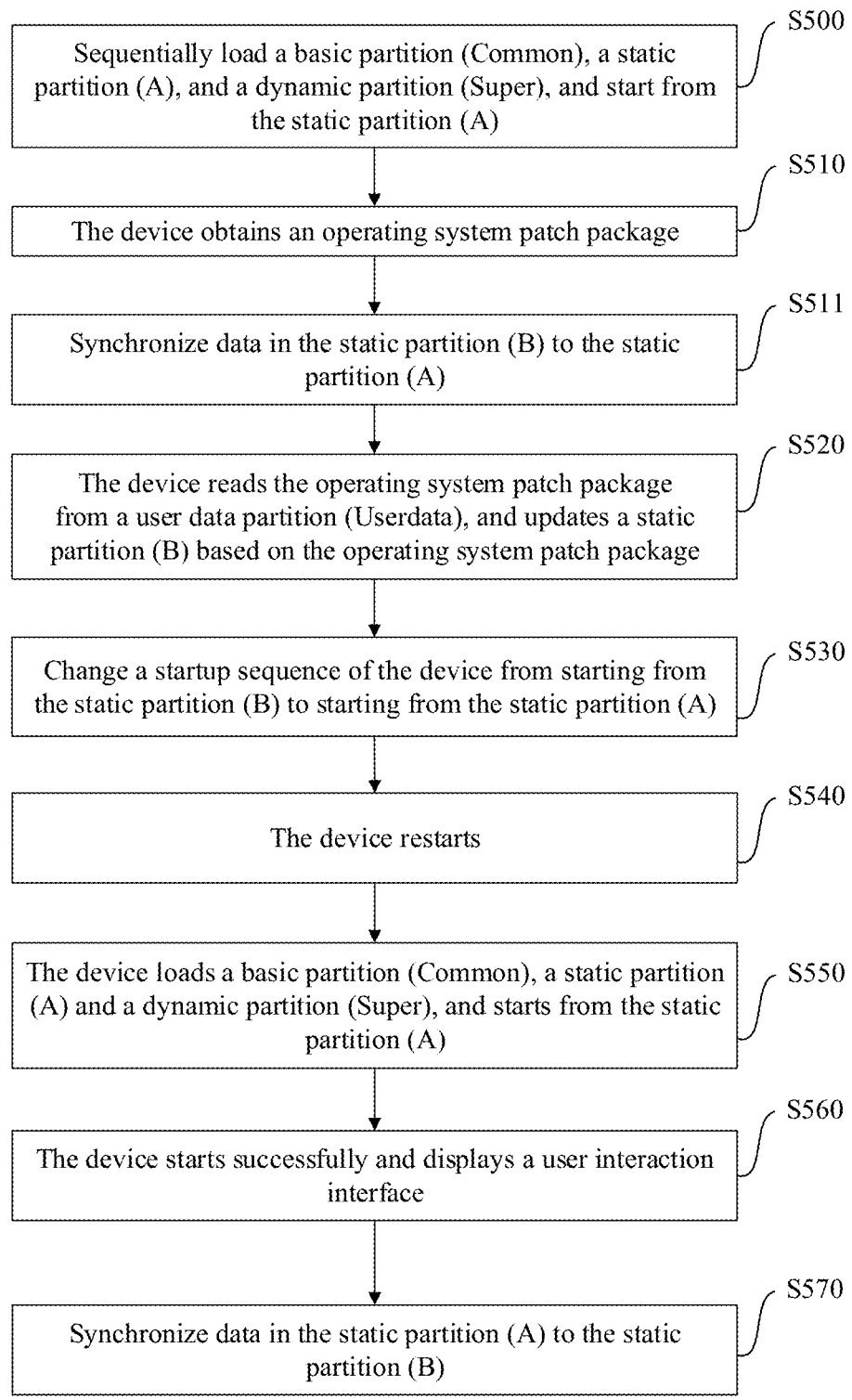
FIG. 5 is a flowchart of updating operating system data according to an embodiment of this application.

FIG. 5 is a flowchart of updating operating system data for the system storage structure shown in FIG. 1 according to an embodiment of this application. After the device starts from the static partition (A), the device performs an operating system upgrade based on the procedure shown in FIG. 4, and starts from the static partition (B) to complete the operating system upgrade. After that, in a state in which the device starts from the static partition (B), the device updates data in the static partition of the operating system according to a procedure shown in FIG. 5.

S500: Sequentially load a basic partition (Common), a static partition (B), and a dynamic partition (Super), and start from the static partition (B).

S510: Obtain an operating system patch package. Refer to S210.

S511: Synchronize data in the static partition (B) to a static partition (A).

S520: A device reads the operating system patch package from a user data partition (Userdata), and updates the static partition (A) based on the operating system patch package. Refer to S220.

S530: Change a startup sequence of the device from starting from the static partition (B) to starting from the static partition (A). Refer to S230.

S540: The device restarts. Refer to S240.

S550: The device sequentially loads a basic partition (Common), a static partition (A), and a dynamic partition (Super), and starts from the static partition (A).

S560: The device starts successfully and displays a user interaction interface. In this case, static partition data loaded when the operating system runs is updated data.

Further, a specific implementation of S511 is not specifically limited in this application, and a person skilled in the art may implement S511 in a plurality of feasible implementations. The following uses a specific embodiment as an example to describe a specific implementation procedure of S511.

In S420, the device writes the data in the static partition in the operating system upgrade installation package into the static partition (B). Therefore, if a same operating system upgrade installation package is used, data in the static partition in the operating system upgrade installation package is written into the static partition (A), so that data in the static partition (A) is consistent with data in the static partition (B).

Therefore, in an application scenario, S511 includes: obtaining an operating system upgrade installation package stored in S410 in the user data partition (Userdata), and writing data in a static partition in the operating system upgrade installation package into the static partition (A).

The static partition (A) and the static partition (B) are completely consistent in terms of partition structure and partition size. Therefore, the data in the static partition (A) may be directly mirrored to the static partition (B), or the data in the static partition (B) may be mirrored to the static partition (A).

Figure 6:
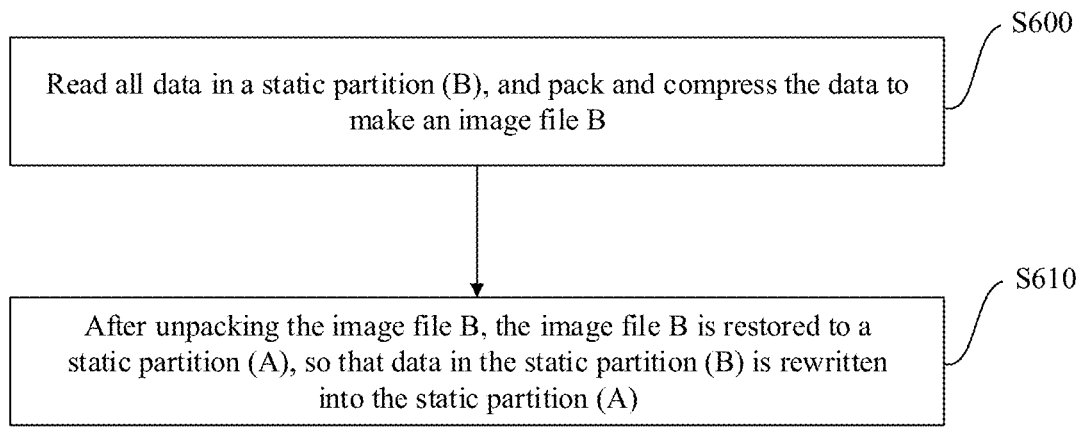
FIG. 6 is a flowchart of static partition synchronization according to an embodiment of this application.

FIG. 6 is a flowchart of an implementation of S511. A terminal device performs the following procedure shown in FIG. 6 to implement S511.

S600: Read all data in a static partition (B), and pack and compress the data to make an image file B.

S610: After unpacking the image file B, the image file B is restored to a static partition (A), so that data in the static partition (B) is rewritten into the static partition (A).

The static partition (A) and the static partition (B) are consistent in terms of partition structure, and include the same sub-partitions. Therefore, it is possible to synchronize the data in the static partition (B) to the static partition (A) by rewriting the files of each sub-partition in the static partition (B) into the corresponding sub-partition in the static partition (A).

Figure 7:
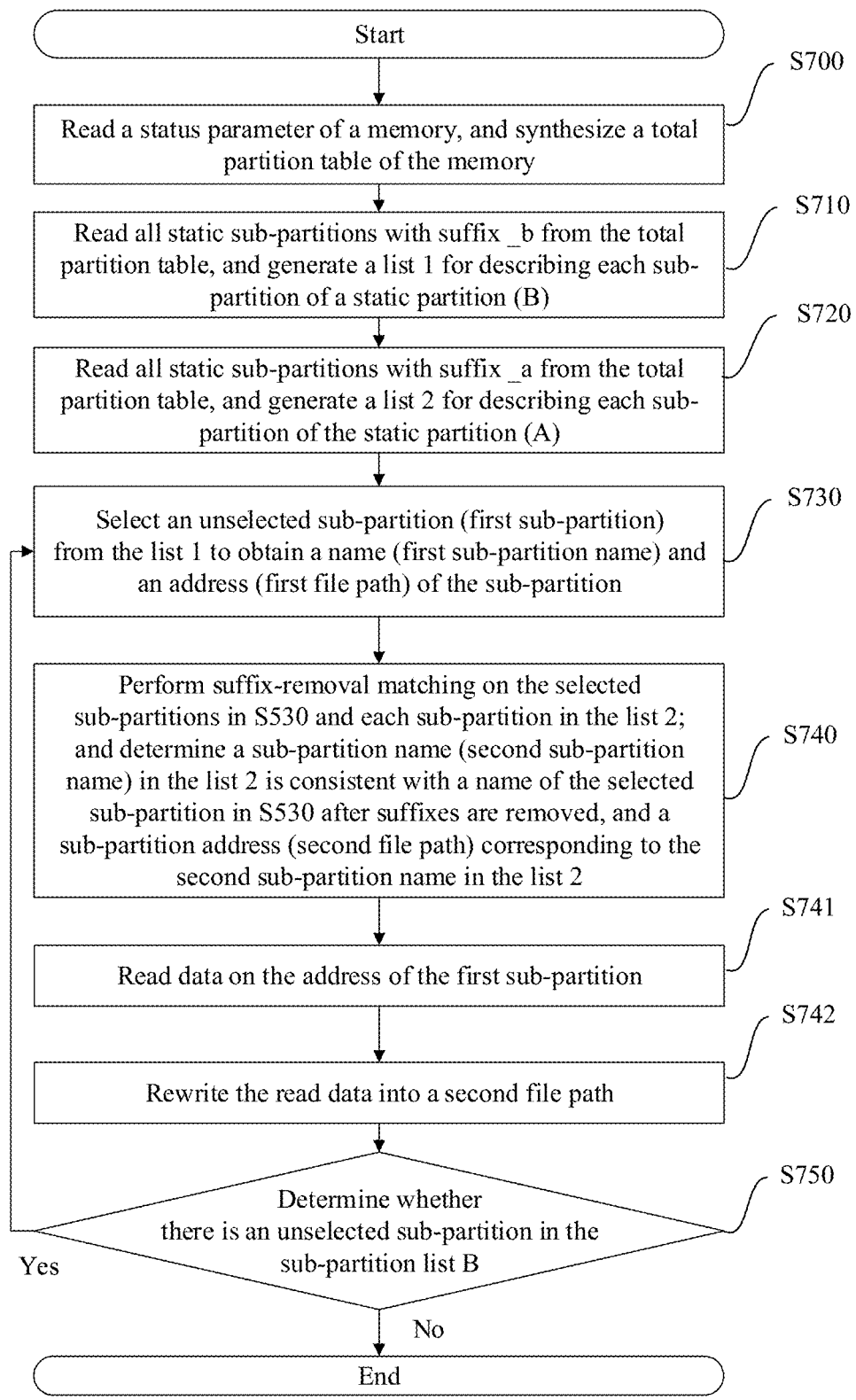
FIG. 7 is a flowchart of static partition synchronization according to an embodiment of this application.

FIG. 7 is a flowchart of an implementation of S511. A terminal device performs the following procedure shown in FIG. 7 to implement S511.

S700: Read a parameter (the parameter is pre-stored in the device before the device leaves the factory) related to partition tables in a memory of the device, and synthesize a total partition table of the memory.

For example, address mapping descriptions of all partitions under/dev/block/by-name/are read, and address mappings of all partitions are integrated into the total partition table.

For another example, a partition table stored in the MBR is read.

S710: Read all static sub-partitions with suffix _b from the total partition table, and generate a list 1 for describing each sub-partition of a static partition (B), where the list 1 includes a name and an address of each sub-partition of the static partition (B). For example:

TABLE 1

| Number | Sub-partition name | Sub-partition address (file path) | Selected status |
|---|---|---|---|
| 1 | bootloader_b | /dev/block/by-name/bootloader_b | 0 |
| 2 | boot_b | /dev/block/by-name/boot_b | 0 |
| 3 | vendor_boot_b | /dev/block/by-name/vendor_boot_b | 0 |
| 4 | dtbo_b | /dev/block/by-name/dtbo_b | 0 |
| 5 | vbmeta_b | /dev/block/by-name/vbmeta_b | 0 |

S720: Read all static sub-partitions with suffix _a from the total partition table, and generate a list 2 for describing each sub-partition of the static partition (A), where the list 2 includes a name and an address of each sub-partition of the static partition (A). For example:

TABLE 2

| Number | Sub-partition name | Sub-partition address (file path) |
|---|---|---|
| 1 | bootloader_a | /dev/block/by-name/bootloader_a |
| 2 | boot_a | /dev/block/by-name/boot_a |
| 3 | vendor_boot_a | /dev/block/by-name/vendor_boot_a |
| 4 | dtbo_a | /dev/block/by-name/dtbo_a |
| 5 | vbmeta_a | /dev/block/by-name/vbmeta_a |

It should be noted herein that, in Table 1 and Table 2, addresses of the sub-partitions are represented in a file path manner. In an actual application scenario, a person skilled in the art may describe the addresses of the sub-partitions in a plurality of manners. For example, a linear address description is used.

S730: Select an unselected sub-partition (the first sub-partition) from the list 1 to obtain a name (name of the first sub-partition) and an address (the first file path) of the sub-partition.

Specifically, before S730, none of the sub-partitions in the list 1 is selected. In S730, sub-partitions may be sequentially selected based on a sequence (number sequence) of sub-partitions in list 1, or may be randomly selected from all sub-partitions that are not selected.

Further, after a sub-partition is selected, the sub-partition is marked for subsequently determining whether the sub-partition has been selected. For example, as shown in Table 1, a selected status column is added to Table 1, and an initial value of a selected state is 0. If a sub-partition is selected, the selected state is changed to 1.

S740: Perform suffix-removal matching on the selected sub-partitions in S730 and each sub-partition in the list 2; and determine a sub-partition name (name of the second sub-partition) in the list 2 that is the same as a name of the selected sub-partition in S730 after suffixes are removed, and a sub-partition address (the second file path) corresponding to the second sub-partition name in the list 2.

S741: Read data under a first file path.
S742: Rewrite the read data into a second file path.
S750: Determine whether there is an unselected sub-partition in the list 1; and
   if yes, return to step S730 and reselect the first sub-partition; or
   if no, synchronization of the static partition is completed.

Table 1 and Table 2 are used as examples. In an application scenario, the device performs the following procedure:

selecting the first sub-partition (bootloader_b sub-partition of number 1) whose selected state is 0 in Table 1, and modifying the selected state of the number 1 to 1;

performing, by using bootloader_b, suffix-removal matching on all sub-partition names in Table 2; because bootloader_a is the same as bootloader_b after _a and _b are removed respectively, bootloader_a (the second sub-partition) is matched according to bootloader_b;

reading a file path/dev/block/by-name/bootloader_b (the first file path) corresponding to bootloader_b from Table 1;

reading a file path/dev/block/by-name/bootloader_a (the second file path) corresponding to bootloader_a from Table 2;

reading data under/dev/block/by-name/bootloader_b and rewriting the read data into /dev/block/by-name/bootloader_a;

because a sub-partition whose selected state is 0 still exists in Table 1, selecting a first sub-partition whose selected state is 0 in Table 1 (boot_b sub-partition of number 2), and changing the selected state of number 2 to 1;

performing, by using boot_b, suffix-removal matching on all sub-partition names in Table 2; because boot_a is the same as boot_b are after _a and _b are removed respectively, boot_a is matched according to boot_b;

reading a file path/dev/block/by-name/boot_b corresponding to boot_b from Table 1;

reading a file path/dev/block/by-name/boot_a corresponding to boot_a from Table 2;

reading data under/dev/block/by-name/boot_b and rewriting the read data into /dev/block/by-name/boot_a;

because a sub-partition whose selected state is 0 still exists in Table 1, selecting a first sub-partition whose selected state is 0 in Table 1 (vendor_boot_b sub-partition of number 3), and changing the selected state of number 3 to 1;

performing, by using vendor_boot_b, suffix-removal matching on all sub-partition names in Table 2; because vendor_boot_a is the same as vendor_boot_b after _a and _b are removed respectively, vendor_boot_a is matched according to vendor_boot_b;

reading a file path/dev/block/by-name/vendor_boot_b corresponding to vendor_boot_b from Table 1;

reading a file path/dev/block/by-name/vendor_boot_a corresponding to vendor_boot_a from Table 2;

reading data under/dev/block/by-name/vendor_boot_b and rewriting the read data into /dev/block/by-name/vendor_boot_a;

because a sub-partition whose selected state is 0 still exists in Table 1, selecting a first sub-partition whose selected state is 0 in Table 1 (dtbo_b sub-partition of number 4), and changing the selected state of number 4 to 1;

performing, by using dtbo_b, suffix-removal matching on all sub-partition names in Table 2. Because dtbo_a is the same as dtbo_b after _a and _b are removed respectively, dtbo_a is matched according to dtbo_b;

reading a file path/dev/block/by-name/dtbo_b corresponding to dtbo_b from Table 1;

reading a file path/dev/block/by-name/dtbo_a corresponding to vendor_boot_a from Table 2;

reading data under/dev/block/by-name/dtbo_b and rewriting the read data into /dev/block/by-name/dtbo_a;

because a sub-partition whose selected state is 0 still exists in Table 1, selecting a first sub-partition whose selected state is 0 in Table 1 (vbmeta_b sub-partition of number 5), and changing the selected state of number 5 to 1;

performing, by using vbmeta_b, suffix-removal matching on all sub-partition names in Table 2; because vbmeta_a is the same as vbmeta_b after _a and _b are removed respectively, vbmeta_a is matched according to vbmeta_b;

reading a file path/dev/block/by-name/vbmeta_b corresponding to vbmeta_b from Table 1;

reading a file path/dev/block/by-name/vbmeta_a corresponding to vendor_boot_a from Table 2;

reading data under/dev/block/by-name/vbmeta_b and rewriting the read data into /dev/block/by-name/vbmeta_a; and because a sub-partition whose selected state is 0 does not exist in Table 1, synchronization of the static partition is completed.

Further, in the foregoing solution, Table 1 and Table 2 are transitional data, and Table 1 and Table 2 are deleted after synchronization of the static partition is completed.

In a process of upgrading an operating system, in S520, when a read or write operation is performed on data in a part of the static partition (B) according to an operating system upgrade installation package, it is not necessary to rewrite all sub-partitions in the static partition (B). That is, if the data in the static partition (A) and the data in the static partition (B) are completely consistent before the operating system is upgraded, after the operating system is upgraded by using the procedure shown in FIG. 5, the data in some sub-partitions of the static partition (A) and the data in some sub-partitions of the static partition (B) may still be consistent. Therefore, in a process of synchronizing data in the static partition (B) to the static partition (A), if a sub-partition in the static partition (B) and a sub-partition in the static partition (A) that include different data are first identified and only the sub-partitions with different data is synchronized, the amount of data that needs to be read or written can be greatly reduced while ensuring data consistency.

Figure 8A:
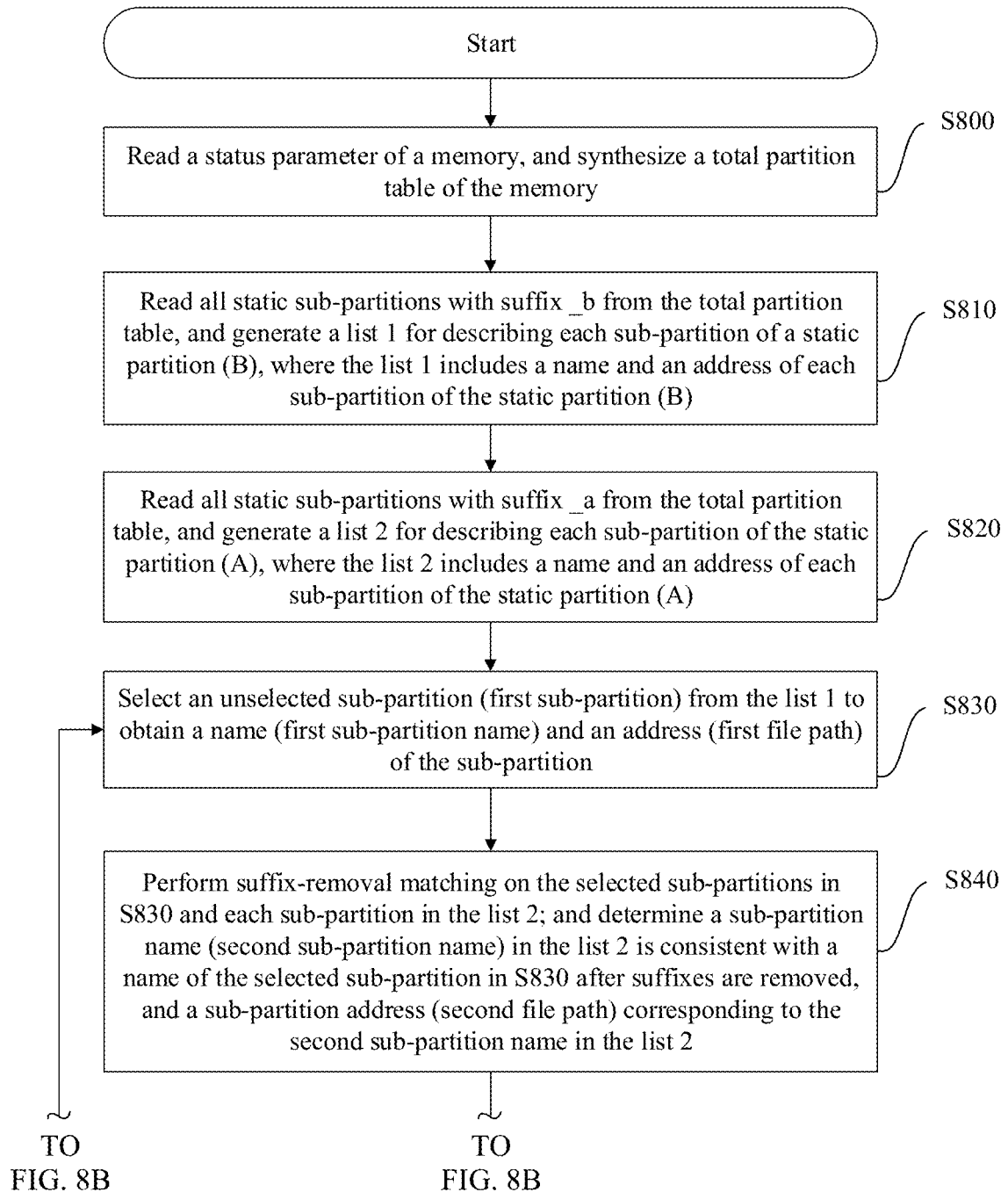
FIG. 8A-FIG. 8B are a flowchart of static partition synchronization according to an embodiment of this application.
Figure 8B:
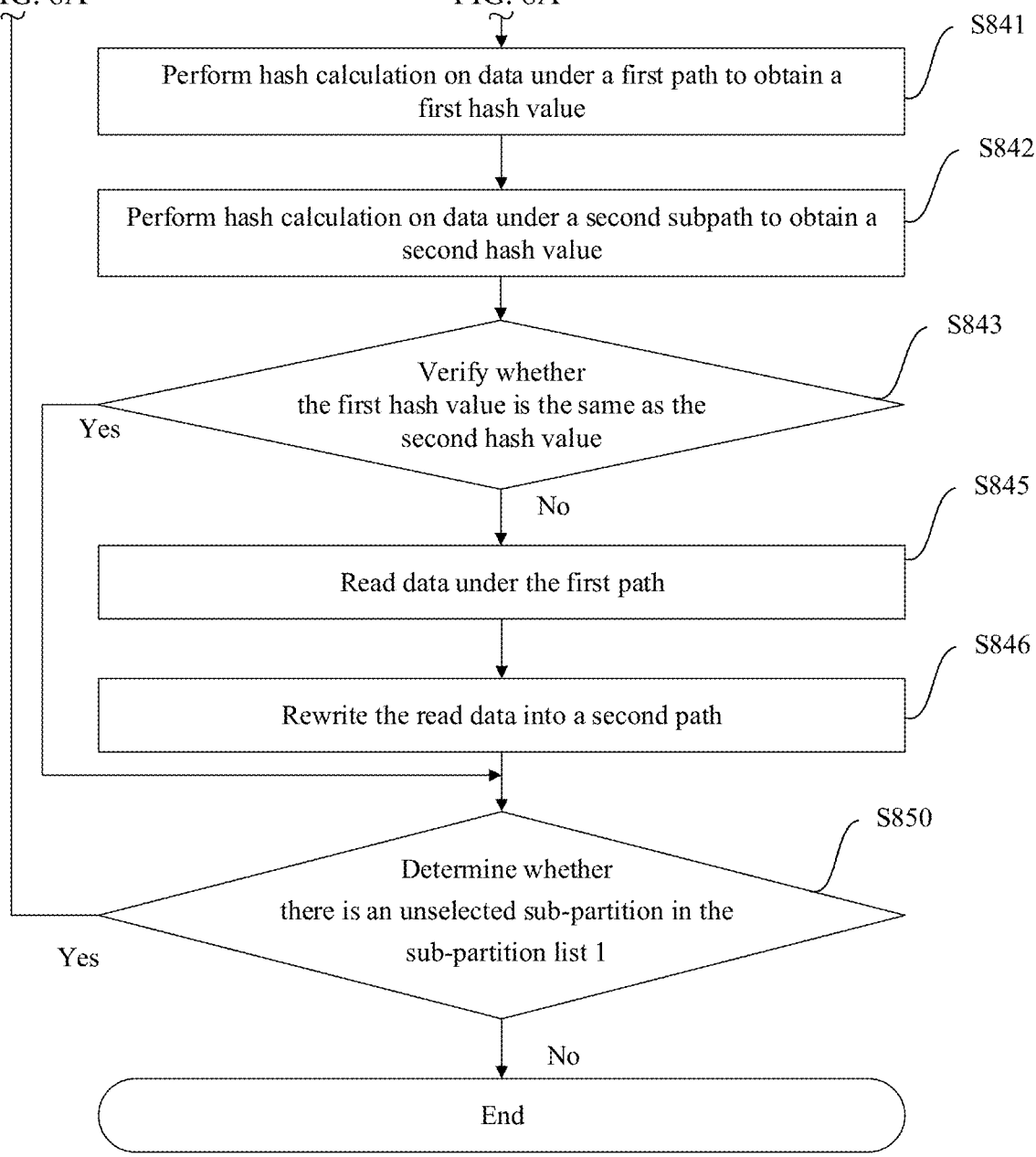

FIG. 8A-FIG. 8B are a flowchart of an implementation of S511. A terminal device performs the following procedure shown in FIG. 8A-FIG. 8B to implement S511.

For S810 to S840, refer to S710 to S740.

S841: Perform hash calculation on data under a first path to obtain a first hash value.

S842: Perform hash calculation on data under a second subpath to obtain a second hash value.

S843: Verify whether the first hash value is the same as the second hash value.

If the two are the same, go to S850.

If the two are different, S845 is performed to read the data in the first path.

S846: Rewrite the read data into a second path.

S850: Refer to S750;

if yes, return to step S830 and reselect the first sub-partition; or if no, synchronization of the static partition is completed.

Further, in the solution of this application, an execution node for data synchronization between the static partition (A) and the static partition (B) is any one of the static partition (A) and the static partition (B) that is written into the upgrade data, an execution time node of S511 is not limited to after S510.

Specifically, after S420, the static partition (B) is written into the upgrade data. However, in this case, the operating system runs to load the static partition (A), and the data in the static partition (B) cannot be synchronized to the static partition (A). After S431, in a process of performing S440, the device loads the static partition (B) to run the operating system, and running of the operating system does not require loading of the static partition (A). In this case, the data in the static partition (B) may be synchronized to the static partition (A). Therefore, in this embodiment of this application, S511 may be performed at any moment after S431. This application imposes no specific limitation on an execution time sequence of S511. A person skilled in the art may set, according to an actual requirement, a synchronization moment of the static partition or a trigger condition for triggering synchronization of the static partition synchronization. The following describes another execution time sequence of S511 by using a specific embodiment as an example.

Figure 9A:
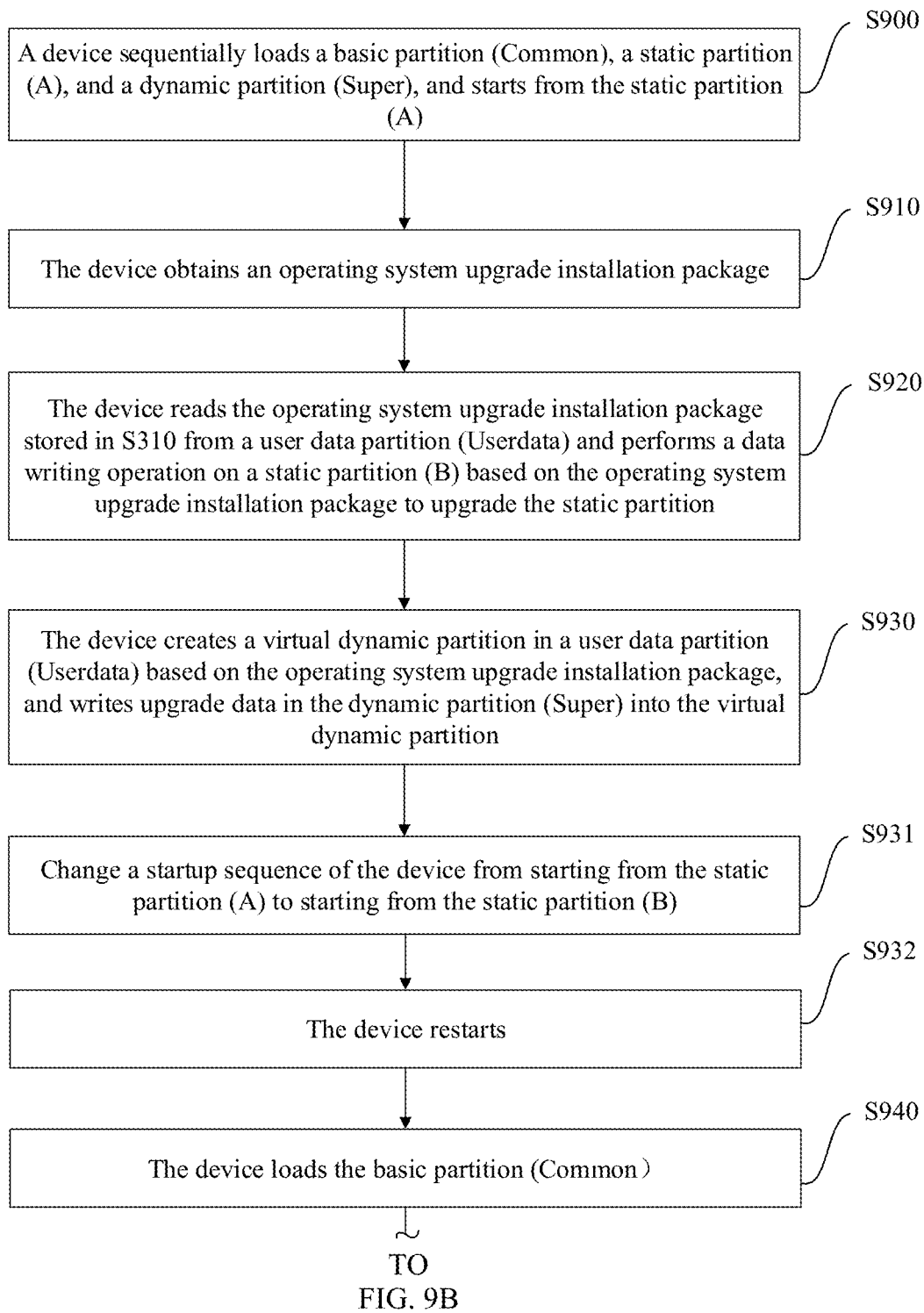
FIG. 9A-FIG. 9B are a flowchart of an operating system upgrade according to an embodiment of this application.
Figure 9B:
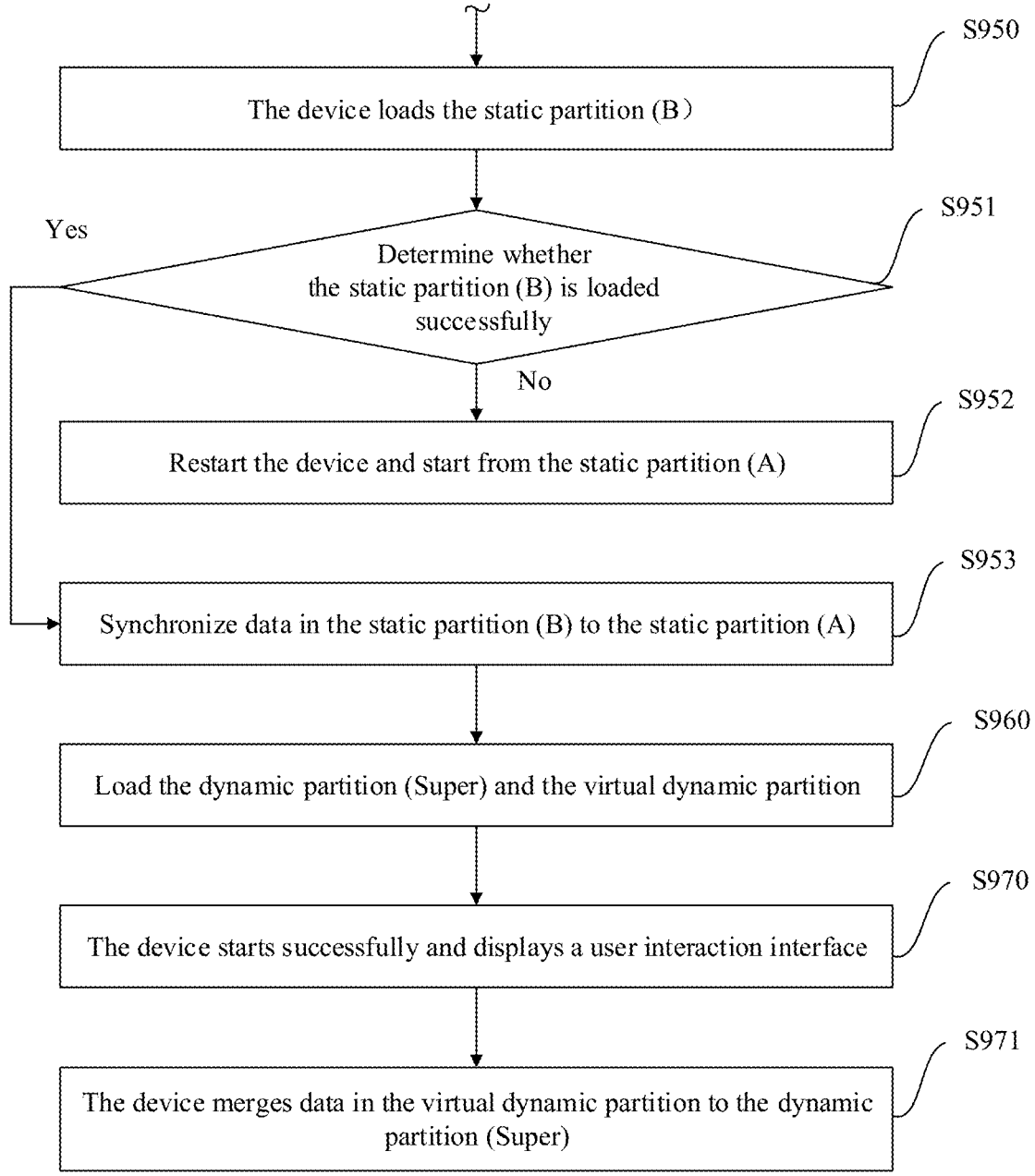

FIG. 9A-FIG. 9B are a flowchart of an operating system upgrade according to an embodiment of this application. When the device currently starts from the static partition (A), the device implements an operating system upgrade and static partition synchronization according to a procedure shown in FIG. 9A-FIG. 9B are.

For S900 to S932, refer to S400 to S432.

S940: A device loads a basic partition (Common).

S950: The device loads a static partition (B).

S951: Determine whether the static partition (B) is loaded successfully.

If the static partition (B) fails to be loaded, S952 is performed to restart the device and to start from the static partition (A).

If the static partition (B) is successfully loaded, S953 is performed to synchronize data in the static partition (B) to the static partition (A). For performing of S953, refer to S511.

S960: Load a dynamic partition (Super) and a virtual dynamic partition. Refer to S541.

S970: The device starts successfully and displays a user interaction interface. Refer to S450.

S971: The device merges data in the virtual dynamic partition to the dynamic partition (Super). Refer to S451.

In a virtual A/B upgrade solution, after the device restarts and starts from the upgraded static partition, the device verifies files that need to be loaded for current system running from the dynamic partition and the virtual dynamic partition. The device will verify the files that need to be loaded for the current system running from the dynamic partition and the virtual dynamic partition only after the verification succeeds. If the verification fails, the device is restarted, and the system is rolled back or the device attempts to reload the file.

Therefore, to avoid performing static partition synchronization when the upgrade fails, in an embodiment of this application, the static partition synchronization is performed only after files that need to be loaded from the dynamic partition and the virtual dynamic partition are successfully verified, or files that need to be loaded from the dynamic partition and the virtual dynamic partition is successfully loaded.

Figure 10A:
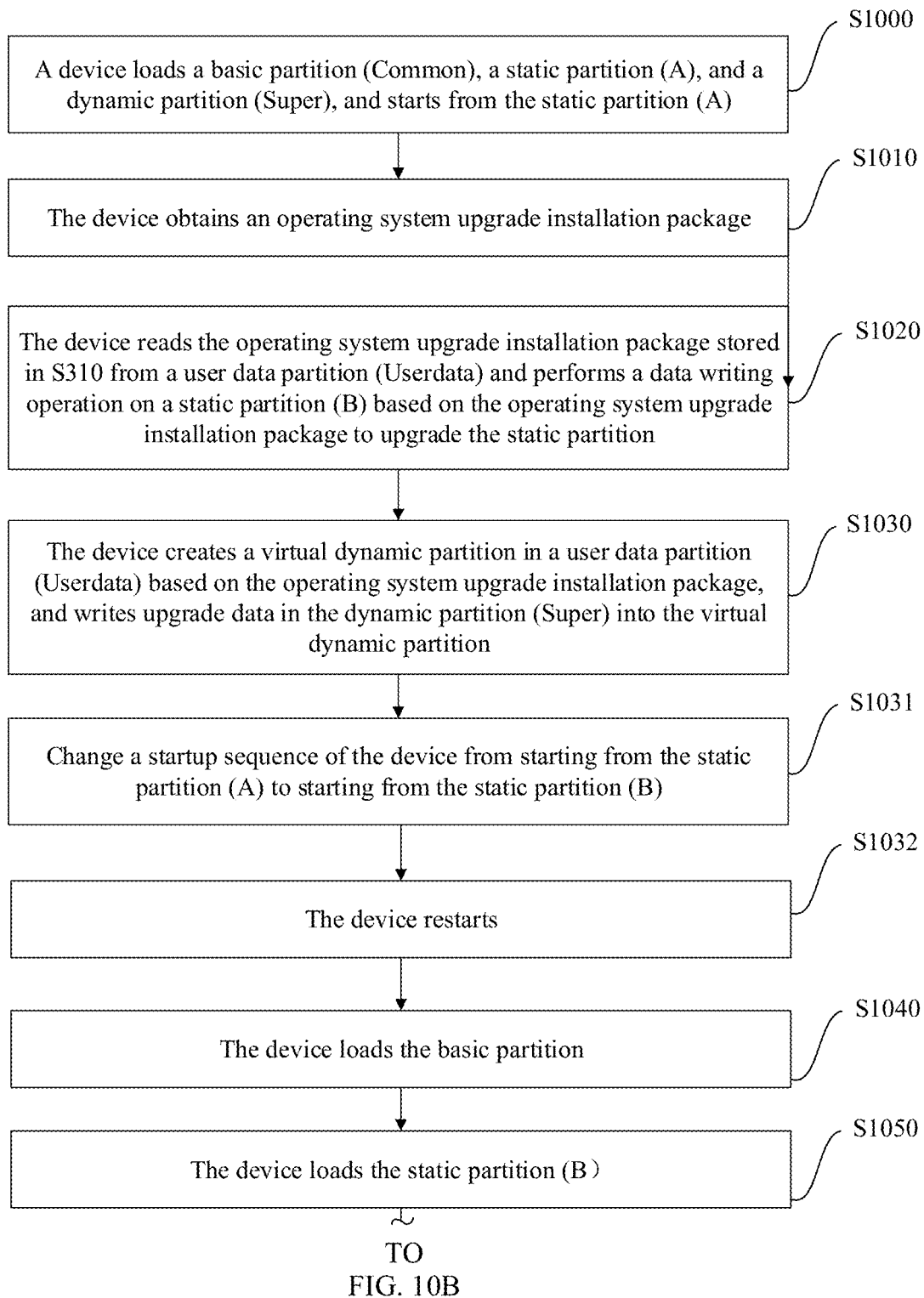
Figure 10B:
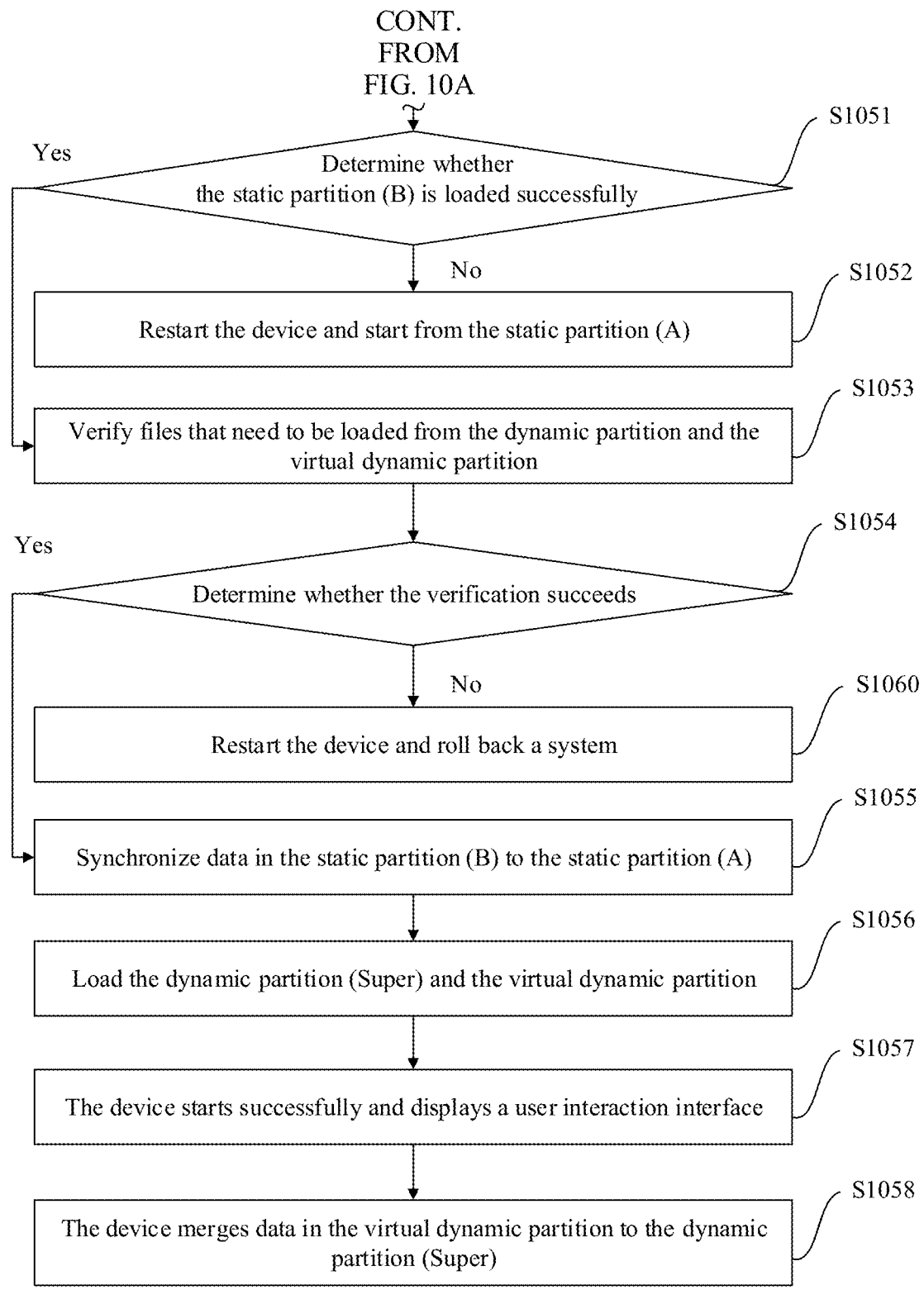

FIG. 10A-FIG. 10B are a flowchart of an operating system upgrade according to an embodiment of this application. When the device currently starts from the static partition (A), the device implements an operating system upgrade and static partition synchronization according to a procedure shown in FIG. 10A-FIG. 10B.

For S1000 to S1052, refer to S900 to S952.

If the static partition (B) is loaded successfully, S1053 is performed to verify files that need to be loaded from the dynamic partition and the virtual dynamic partition. For example, dmverity is used.

S1054: Determine whether the verification succeeds.

If the verification fails, S1060 is performed, the device is restarted and the system is rolled back, for example, starting from the static partition (A).

If the verification succeeds, perform S1055.

S1055: Synchronize data in the static partition (B) to the static partition (A). For performing of S1055, refer to S511.

For S1056 to S1058, refer to S960 to S971.

Further, before S520, the data in the static partition (A) is consistent with the data in the static partition (B). After S520, because the data in the static partition (B) is updated, the data in the static partition (A) is inconsistent with the data in the static partition (B). To ensure that the data in the static partition (A) is consistent with the data in the static partition (B), as shown in FIG. 5, after S560, the device further performs S570 to synchronize the data in the static partition (A) to the static partition (B). For performing of S570, refer to S511.

It may be understood that some or all of the steps or operations in the foregoing embodiment are merely examples. In this embodiment of this application, other operations or variations of various operations may also be performed. In addition, the steps may be performed in an order different from the order presented in the foregoing embodiment, and it may not be necessary to perform all the operations in the foregoing embodiment.

Further, generally, improvements on a technology can be clearly distinguished as improvements on hardware (for example, improvements on circuit structures such as a diode, a transistor, or a switch) or improvements on software (improvements on methods or processes). However, with development of technologies, many current improvements on methods or processes may be considered as direct improvements on a hardware circuit structure. Almost all designers obtain a corresponding hardware circuit structure by programming an improved method or process into a hardware circuit. Therefore, it cannot be said that the improvement of a method or a process cannot be realized by a hardware entity module. For example, a programmable logic device (Programmable Logic Device, PLD) (for example, a field programmable gate array (Field Programmable Gate Array, FPGA)) is an integrated circuit, and a logical function of the programmable logic device is determined by programming a component by an accessor. Designers program a digital device to be "integrated" on a PLD, and there is no need for a chip manufacturer to design and manufacture an application-specific integrated circuit chip. In addition, instead of manually manufacturing an integrated circuit chip, this programming is mostly implemented by using "logic compiler (logic compiler)" software, which is similar to the software compiler used in program development and writing. The original code to be compiled needs to be written in a specific programming language, which is referred to as a hardware description language (Hardware Description Language, HDL). There are many HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). Currently, VHDL (Very-High-Speed Integrated Circuit Hardware Description Language) and Verilog are most commonly used. It should also be clear to a person skilled in the art that a hardware circuit for implementing a logic method procedure can be easily obtained by simply programming the logic of the method procedure into an integrated circuit by using the foregoing several hardware description languages.

Therefore, the method procedure provided in this embodiment of this application may be implemented in a hardware manner. For example, a controller is used to control a touchscreen to implement the method procedure provided in this embodiment of this application.

The controller may be implemented in any suitable manner. For example, the controller may use a microprocessor or a processor and a computer-readable medium storing computer readable program code (for example, software or firmware) executable by the microprocessor or the processor, a logic gate, a switch, an application specific integrated circuit (Application Specific Integrated Circuit, ASIC), a programmable logic controller, and an embedded microcontroller. Examples of the controller include but are not limited to the following microcontrollers: ARC 625D, Atmel AT91SAM, Microchip PIC18F26K20, and Silicone Labs C8051F320. A memory controller may further be implemented as a part of control logic of the memory. A person skilled in the art also knows that, in addition to implementing a controller by using only computer-readable program code, a method step may be logically programmed, so that the controller implements a same function in a form of a logic gate, a switch, an application-specific integrated circuit, a programmable logic controller, an embedded microcontroller, or the like. Therefore, the controller may be considered as a hardware component, and an apparatus included in the controller for implementing various functions may also be considered as a structure in the hardware component. Alternatively, an apparatus for implementing various functions may be considered as a software module implementing a method or a structure in a hardware component.

Corresponding to the foregoing embodiment, this application further provides an electronic device. The electronic device includes a memory configured to store a computer program instruction and a processor configured to execute the program instruction. When the computer program instruction is executed by the processor, the electronic device is triggered to perform the method steps described in the embodiments of this application.

This application further provides a computer program product. The computer program product includes a computer program. When the computer program product runs on a computer, the computer is enabled to perform some or all steps provided in the embodiments of this application.

A person skilled in the art may clearly understand that the technology in the embodiments of the present invention may be implemented by using software and a required universal hardware platform. Based on such an understanding, the technical solutions in the embodiments of the present invention essentially or the part contributing to a conventional technology may be implemented in a form of a software product. The computer software product may be stored in a storage medium, such as a ROM/RAM, a magnetic disk, or an optical disc, and the computer software product may include several instructions for instructing a computer device (which may be a personal computer, a server, or a network device) to perform the methods described in the embodiments or some parts of the embodiments of the present invention.

For the same or similar parts in the embodiments in this specification, reference may be made to each other. In particular, for an apparatus embodiment and a terminal embodiment, because the apparatus embodiment and the terminal embodiment are basically similar to a method embodiment, descriptions are relatively simple. For related parts, refer to descriptions in the method embodiment.

The invention claimed is:

1. An operating system data update method, applied to an electronic device, wherein the electronic device comprises a processor and a memory; the memory comprises a basic partition, a first static partition, a second static partition, a dynamic partition, and a user data partition; after the electronic device starts, data in the basic partition, data in the first static partition, and data in the dynamic partition are loaded to run a first operating system; and after the first operating system runs, the operating system data update method comprises:
   obtaining a patch package based on a version number of the first operating system;
   confirming whether the data in the first static partition is consistent with data in the second static partition or not;
   updating the data in the second static partition based on the patch package, after confirming that the data in the first static partition is consistent with the data in the second static partition;
   modifying a startup sequence of the electronic device from starting from the first static partition to starting from the second static partition;
   restarting the electronic device; and
   loading the data in the basic partition, the data in the second static partition, and the data in the dynamic partition to run the first operating system with the updated data in the second static partition.

2. The operating system data update method according to claim 1, wherein before updating the data in the second static partition, the operating system data update method further comprises:
   reading data in each sub-partition of the first static partition; and
   rewriting the data in each sub-partition of the first static partition into a corresponding sub-partition of the second static partition.

3. The operating system data update method according to claim 1, wherein before updating the data in the second static partition, the operating system data update method further comprises:
   calculating a hash value of data in a first sub-partition, wherein the first sub-partition is a sub-partition of the first static partition;
   calculating a hash value of data in a second sub-partition, wherein the second sub-partition is a sub-partition of the second static partition, and the second sub-partition corresponds to the first sub-partition; and
   rewriting the data in the first sub-partition into the second sub-partition when the hash value of the data in the first sub-partition is different from the hash value of the data in the second sub-partition.

4. The operating system data update method according to claim 1, wherein after obtaining the patch package, the operating system data update method further comprises:

synchronizing the data in the first static partition to the second static partition.

5. The operating system data update method according to claim 1, wherein before obtaining the patch package, the operating system data update method further comprises:
loading the data in the basic partition, data in the second static partition, and the data in the dynamic partition to run a second operating system;
obtaining an upgrade installation package, wherein the upgrade installation package comprises a static partition upgrade file;
upgrading the data in the first static partition based on the static partition upgrade file;
modifying a startup sequence of the electronic device from starting from the second static partition to starting from the first static partition;
restarting the electronic device, and determining that a current startup sequence is starting from the first static partition;
loading the data in the basic partition, the data in the first static partition, and the data in the dynamic partition to run the first operating system; and
after restarting the electronic device, and determining that the current startup sequence is starting from the first static partition, synchronizing the data in the first static partition to the second static partition.

6. The operating system data update method according to claim 5, wherein in a process of loading the data in the first static partition, synchronizing the data in the first static partition to the second static partition after verification of the data in the first static partition succeeds.

7. The operating system data update method according to claim 5, wherein in a process of loading the data in the dynamic partition, synchronizing the data in the first static partition to the second static partition after verification of a to-be-loaded dynamic partition file succeeds.

8. The operating system data update method according to claim 5, wherein the upgrade installation package further comprises dynamic partition upgrade data; and
before restarting the electronic device, and determining that the current startup sequence is starting from the first static partition, the operating system data update method further comprises:
creating a virtual dynamic partition in the user data partition, and storing the dynamic partition upgrade data in the virtual dynamic partition;
loading the data in the basic partition, the data in the first static partition, and the data in the dynamic partition to run the first operating system comprises loading the data in the dynamic partition and the dynamic partition upgrade data;
after loading the data in the basic partition, the data in the first static partition, and the data in the dynamic partition to run the first operating system, the operating system data update method further comprises:
merging the dynamic partition upgrade data to the dynamic partition; and
after merging the dynamic partition upgrade data to the dynamic partition, synchronizing the data in the first static partition to the second static partition.

9. The operating system data update method according to claim 1, wherein the patch package comprises an update positioning description and update data, the operating system data update method further comprises:
adding a path correction for the second static partition to the update positioning description.

10. The operating system data update method according to claim 9, wherein the update positioning description is a first path pointing to a first file, the update data is a second file, the second file is a file with a same name as the first file, the second file is an update file of the first file, and the updated data in the second static partition based on the update positioning description and the update data in the patch package comprises:
adding a directory name suffix corresponding to the second static partition to the first path, to generate a second path;
locating the first file in the second static partition based on the second path;
deleting the first file in the second static partition; and
writing the second file into the second path.

11. The operating system data update method according to claim 10, wherein the update positioning description is a third path, the update data is a third file, and the updated data in the second static partition based on the update positioning description and the update data in the patch package comprises:
adding a directory name suffix corresponding to the second static partition to the third path, to generate a fourth path; and
writing the third file into the fourth path.

12. The operating system data update method according to claim 11, wherein the update positioning description is a fifth path pointing to a first code segment of a fourth file, the update data is a second code segment, and the updated data in the second static partition based on the update positioning description and the update data in the patch package comprises:
adding a directory name suffix corresponding to the second static partition to the fifth path, to generate a sixth path;
locating the fourth file in the second static partition based on the sixth path;
opening the fourth file to locate the first code segment; and
rewriting the second code segment into the first code segment.

13. An electronic device, wherein the electronic device comprises a processor and a memory, the memory comprises a basic partition, a first static partition, a second static partition, a dynamic partition, and a user data partition, and the processor is configured to execute software code stored in the memory, so that the electronic device loads data in the basic partition, data in the first static partition, and data in the dynamic partition to run a first operating system after starting the electronic device, and
wherein the memory further stores instructions, which when executed by the processor, cause the electronic device to perform operations, the operations comprising:
obtaining a patch package based on a version number of the first operating system;
confirming whether the data in the first static partition is consistent with data in the second static partition or not;
updating data in the second static partition based on the patch package, after confirming that the data in the first static partition is consistent with the data in the second static partition;
modifying a startup sequence of the electronic device from starting from the first static partition to starting from the second static partition ;

restarting the electronic device; and loading the data in the basic partition, the data in the second static partition, and the data in the dynamic partition to run the first operating system with the updated data in the second static partition.

14. The electronic device according to claim 13, wherein before updating the data in the second static partition, the operations further comprise:

reading data in each sub-partition of the first static partition; and rewriting the data in each sub-partition of the first static partition into a corresponding sub-partition of the second static partition.

15. The electronic device according to claim 13, wherein before updating the data in the second static partition, the operations further comprise:

calculating a hash value of data in a first sub-partition, wherein the first sub-partition is a sub-partition of the first static partition;

calculating a hash value of data in a second sub-partition, wherein the second sub-partition is a sub-partition of the second static partition, and the second sub-partition corresponds to the first sub-partition; and rewriting the data in the first sub-partition into the second sub-partition when the hash value of the data in the first sub-partition is different from the hash value of the data in the second sub-partition.

16. The electronic device according to claim 13, wherein after obtaining the patch package, the operations further comprise:

synchronizing the data in the first static partition to the second static partition.

17. A non-transitory computer-readable storage medium, wherein a computer program is stored in the non-transitory computer-readable storage medium, and when the computer program is run on an electronic device. causes the electronic device to perform operations, wherein the electronic device comprises a processor and a memory, the memory comprises a basic partition, a first static partition, a second static partition, a dynamic partition, and a user data partition, and the processor is configured to execute software code stored in the memory, so that the electronic device loads data in the basic partition, data in the first static partition, and data in the dynamic partition to run a first operating system after starting the electronic device, the operations comprising:

obtaining a patch package based on a version number of the first operating system;

confirming whether the data in the first static partition is consistent with data in the second static partition or not;

updating data in the second static partition based on the patch package, after confirming that the data in the first static partition is consistent with the data in the second static partition;

modifying a startup sequence of the electronic device from starting from the first static partition to starting from the second static partition ;

restarting the electronic device; and loading the data in the basic partition, the data in the second static partition, and the data in the dynamic partition to run the first operating system with the updated data in the second static partition.

18. The non-transitory computer-readable storage medium according to claim 17, wherein before updating the data in the second static partition, the operations further comprise:

reading data in each sub-partition of the first static partition; and rewriting the data in each sub-partition of the first static partition into a corresponding sub-partition of the second static partition.

19. The non-transitory computer-readable storage medium according to claim 17, wherein before updating the data in the second static partition, the operations further comprise:

calculating a hash value of data in a first sub-partition, wherein the first sub-partition is a sub-partition of the first static partition;

calculating a hash value of data in a second sub-partition, wherein the second sub-partition is a sub-partition of the second static partition, and the second sub-partition corresponds to the first sub-partition; and rewriting the data in the first sub-partition into the second sub-partition when the hash value of the data in the first sub-partition is different from the hash value of the data in the second sub-partition.

20. The non-transitory computer-readable storage medium according to claim 17, wherein after obtaining the patch package, the operations further comprise:

synchronizing the data in the first static partition to the second static partition.

* * * * *